United States Patent
Henderson et al.

(10) Patent No.: US 8,396,269 B2
(45) Date of Patent: Mar. 12, 2013

(54) IMAGE QUALITY ASSESSMENT INCLUDING COMPARISON OF OVERLAPPED MARGINS

(75) Inventors: David L. Henderson, Clifton Park, NY (US); Kevin B. Kenny, Niskayuna, NY (US); Dirk R. Padfield, Albany, NY (US); Dashan Gao, Rexford, NY (US); Richard R. McKay, East Windsor, NJ (US); Vipul A. Baxi, Freehold, NJ (US); Robert J. Filkins, Niskayuna, NY (US); Michael C. Montalto, Jackson, NJ (US)

(73) Assignee: Digital Pathco LLC, Pittsburgh, PA (US)

( * ) Notice: Subject to any disclaimer, the term of this patent is extended or adjusted under 35 U.S.C. 154(b) by 413 days.

(21) Appl. No.: 12/756,877

(22) Filed: Apr. 8, 2010

(65) Prior Publication Data

US 2011/0249910 A1   Oct. 13, 2011

(51) Int. Cl.
*G06K 9/46* (2006.01)
(52) U.S. Cl. .................. 382/128; 382/195; 382/284
(58) Field of Classification Search .................. 382/128, 382/284, 190, 195
See application file for complete search history.

(56) References Cited

U.S. PATENT DOCUMENTS

| | | | |
|---|---|---|---|
| 6,215,914 B1 * | 4/2001 | Nakamura et al. | 382/284 |
| 6,785,427 B1 | 8/2004 | Zhou | |
| 7,030,351 B2 * | 4/2006 | Wasserman et al. | 250/201.3 |
| 7,110,586 B2 | 9/2006 | Bacus | |
| 7,305,109 B1 * | 12/2007 | Gagnon et al. | 382/128 |
| 7,512,286 B2 | 3/2009 | Luo | |
| 7,545,985 B2 | 6/2009 | Zhang et al. | |
| 7,576,307 B2 | 8/2009 | Yazdanfar et al. | |
| 2001/0017945 A1 * | 8/2001 | Horie | 382/284 |
| 2004/0004614 A1 | 1/2004 | Bacus | |
| 2006/0028549 A1 | 2/2006 | Grindstaff et al. | |
| 2006/0204072 A1 | 9/2006 | Wetzel et al. | |
| 2007/0030529 A1 | 2/2007 | Eichhorn et al. | |
| 2007/0140543 A1 | 6/2007 | D'Errico et al. | |
| 2008/0137938 A1 | 6/2008 | Zahniser | |
| 2008/0240613 A1 | 10/2008 | Dietz et al. | |
| 2008/0273788 A1 | 11/2008 | Soenksen et al. | |
| 2008/0304722 A1 | 12/2008 | Soenksen | |
| 2009/0116713 A1 | 5/2009 | Yan et al. | |

(Continued)

OTHER PUBLICATIONS

Siavash Yazdanfar, Kevin B. Kenny, Krenar Tasimi, Alex D. Corwin, Elizabeth L. Dixon, and Robert J. Filkins, "Simple and robust image-based autofocusing for digital microscopy," Opt. Express 16, 8670-8677 (2008).

(Continued)

*Primary Examiner* — Jon Chang
(74) *Attorney, Agent, or Firm* — Duane Morris LLP

(57) ABSTRACT

Image quality is assessed for a digital image that is a composite of tiles or other image segments, especially focus accuracy for a microscopic pathology sample. An algorithm or combination of algorithms correlated to image quality is applied to pixel data at margins where adjacent image segments overlap and thus contain the same content in separately acquired images. The margins may be edges merged to join the image segments smoothly into a composite image, and typically occur on four sides of the image segments. The two versions of the same image content at each margin are processed by the quality algorithm, producing two assessment values. A sign and difference value are compared with other image segments, including by subsets selected for the orientation of the margins on sides on the image segments. The differences are mapped to displays. Selection criteria determine segments to be re-acquired.

21 Claims, 7 Drawing Sheets

U.S. PATENT DOCUMENTS

2009/0141932 A1  6/2009  Jones et al.
2009/0195688 A1  8/2009  Henderson et al.

OTHER PUBLICATIONS

Y. Sun, S. Duthaler, and B. J. Nelson, "Autofocusing in computer microscopy: Selecting the optimal focus algorithm," Microsc. Res. Tech. 65, 139-149 (2004).

L. Firestone, K. Cook, K. Culp, N. Talsania, and K. Preston, "Comparison of autofocus methods for automated microscopy," Cytometry 12, 195-206 (1991).

V. Della Mea, F. Viel, and C. A. Beltrami, "A pixel-based autofocusing technique for digital histologic and cytologic slides," Comput. Med. Imag. Grap. 29, 333-341 (2005).

Y. Liron, Y. Paran, G. Zatorsky, B. Geiger, and Z. Kam, "Laser autofocusing for high-resolution cell biological imaging," J. Microsc. 221, 145-151 (2006).

S. K. Nayar, and Y. Nakagawa, "Shape from focus," IEEE Trans. Pattern Anal. Machine Intell. 16, 824-831 (1994).

X. Y. Liu, W. H. Wang, and Y. Sun, "Dynamic evaluation of autofocusing for automated microscopic analysis of blood smear and pap smear," J. Microsc. 227, 15-23 (2007).

ASantos, C.O. Solorzano, J.J. Vaquero, J.M. Pena, N. Malpica, F. Pozo, "Evaluation of autofocus functions in molecular cytogenetic analysis," J. Microsc 188:264-272 (1997).

D. Padfield, J. Rittscher, B. Roysam, "Defocus and low CNR detection for cell tracking applications," MIAAB Workshop (2008).

J.F. Canny, "A computational approach to edge detection," IEEE PAMI, vol. 8, No. 6, pp. 679-698 (1986).

T.T.T. Yeo, S.H.O. Jayasooriah, R. Sinniah, "Autofocusing for tissue microscopy," Img. and Vis. Comp., vol. 11, pp. 629-639 (1993).

E. Krotkov, "Focusing," I. J of Computer Vision, vol. 1, No. 3, pp. 223-237 (1988).

International Search Report and Written Opinion in corresponding application PCT/US2011/031706.

* cited by examiner

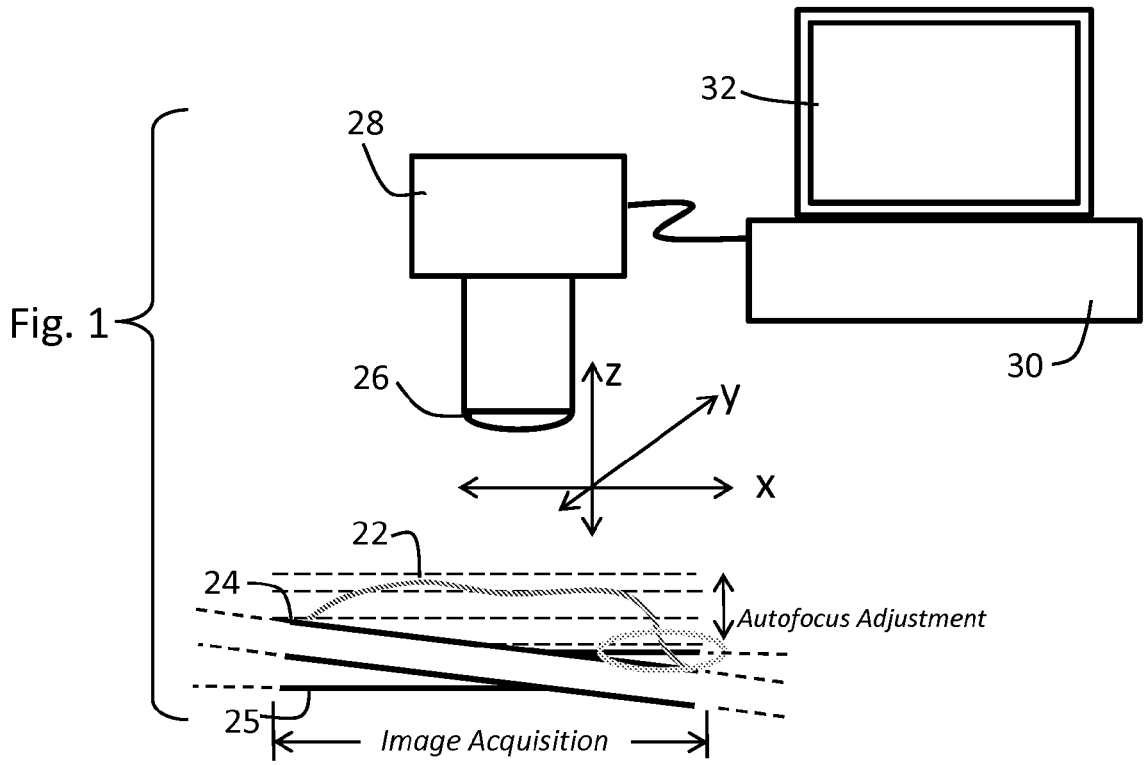
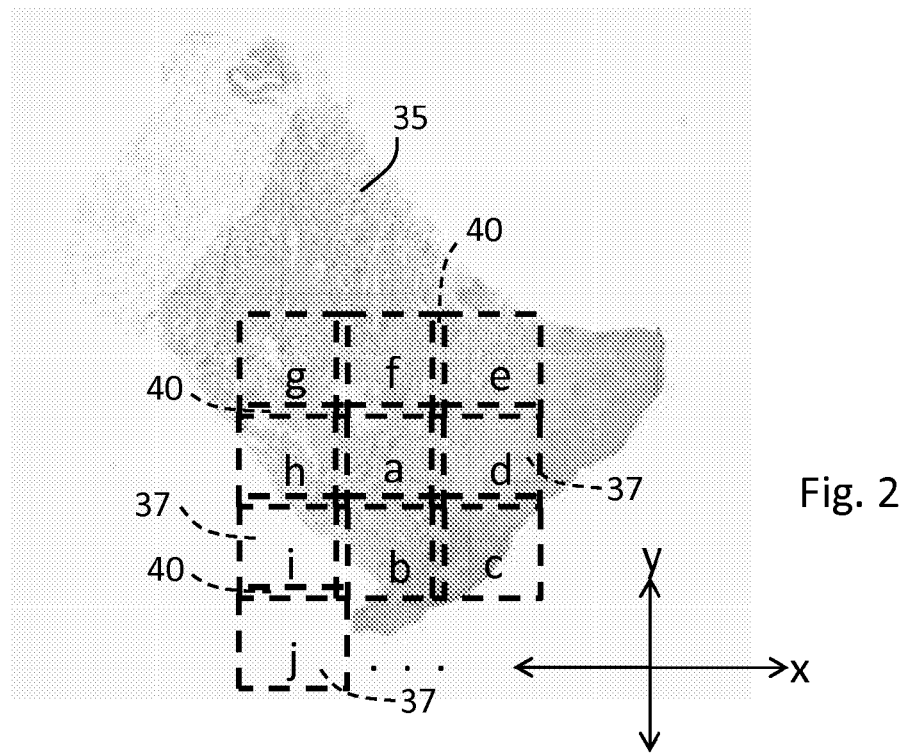

IMAGE QUALITY ASSESSMENT INCLUDING COMPARISON OF OVERLAPPED MARGINS

BACKGROUND

This disclosure concerns automated quality grading for digital images assembled from image segments that are joined at overlaps along one or more margins.

In the processing of microscopic images of pathology and histology samples on tissue sample slides, digital images of small adjacent areas over the surface of the sample can be captured at high magnification and/or resolution, and then displayed and managed as parts of a larger image that the user navigates using a digital display device. Small squares or strips or other image shapes that were separately captured, are image segments that can be aligned relative to one another to make up a mosaic. Each square or strip or other separately captured image of any arbitrary shape is a "tile" in the mosaic.

The whole mosaic of separately captured images, or some part of the mosaic encompassing a group of adjacent tiles, might be shown on the display device at relatively low resolution. The user preferably can zoom to a higher resolution view wherein the display encompasses an image segment of one mosaic tile, or a still higher resolution view of an area smaller than a tile. The user can navigate by panning the display across a boundary between adjacent image segments obtained from two different image acquisition operations, namely across the border between tiles.

The separately captured image areas need not be small or regularly shaped or in regular positions in an array. Larger portions such as full sample height, partial width image blocks, laterally and/or longitudinally abutted blocks such as quadrants, blocks of different sizes or shapes, are all possible. The image areas might be acquired as snapshot images or as the result of scanning over elongated strips over time using a line scan technique. For purposes of discussion in this disclosure, separately acquired image segments of any shape or size generally will be called tiles.

Inasmuch as the images are collected in separate image collection operations, it is advantageous to align the images accurately to enable smooth navigation spanning the image boundaries. This can be done by lining up edges or shapes that span across the border between two images or tiles. In one technique, the images are captured with overlapping margins. The adjacent images contain the same content in the margins. The adjacent tiles are aligned by adjusting their relative positions until the features shown in the two overlapped margins are registered. It is possible to slice an abrupt transition at which the pixel values for one adjacent tile change to the pixel values of the next adjacent tile. For a smooth transition, the pixel data of the image segments can be merged across the margin by a weighted averaging of pixel data values or similar merging techniques, generally known as "stitching" together the adjacent images. In the final mosaic image, there is one X-Y field of pixel data values, although in the originally captured tiles, the overlapping margins provided redundant images of the overlapping margins.

A digital pathology system advantageously emulates certain aspects of sample handling and microscope manipulation that are familiar to pathologists. In traditional manual operations, samples mounted on glass slides are placed on the stage of an optical microscope configured for viewing at some selected magnification that may be great or small. The view of the slide seen through the microscope at high magnification is a view of a small targeted area. The area selected as the target can be translated across the slide by adjusting the X-Y position of the stage and/or by moving the slide relative to the stage. The field of view can be made larger or smaller by changing the extent of magnification, typically by rotating a mounting so as to substitute a different objective lens in the optical path. Zooming in or out in a digital display emulates changing magnification. Panning a digital display emulates moving the X-Y position of a slide on a microscope stage.

In some digital pathology systems, one or more cameras coupled to the microscope optics collects a stop image frame, and the stage is advanced in an X and/or Y direction to present a next area adjacent to the previously imaged area and another image is collected. In such an arrangement, the respective tile images can be stitched or merged together at top, bottom and lateral side edges. In a system having a linear scanning charge-coupled-device sensor (CCD), the sensor collects an elongated line image while being moved in a direction more or less perpendicular to its direction of sensor elongation, at a sampling period that produces a predetermined pixel spacing. The necessary merging or stitching in such a system may be limited to two opposite edges of a strip (or one edge for the extreme top and bottom strips).

Another degree of freedom in a microscope is in the Z direction, perpendicular to the X-Y plane of the sample on the stage. The optics of a microscope are such that features of a sample appear to be in focus when located at a specific distance from the objective lens or lens array, i.e., at a correct focal distance. The features become blurred or indistinct if nearer to the lens or farther away. There is a certain depth of field or range of distances in the Z direction wherein features appear to be in focus. That depth of field is affected by the lens aperture size.

The surface at which features appear to be in focus is generally shaped as a sphere. The sphere may have a relatively longer or shorter radius compared to the format size of the image, but is nevertheless a sphere. The pathology or histology sample on the sample slide, however, has a surface that is generally along a plane rather than a spherical surface. Image features in the center of the field of view may be in focus when features at the periphery are not in focus (or vice versa). The sample itself may be thicker or thinner in different areas, such that the topography of the sample places lower or higher parts on the surface of the sample at the optimal focus distance or above or below the optimal distance. If the sample or the stage is tilted, the quality of the image may vary continuously from one part of the image to another. The optics of the microscope may have aspects such as optical aberration or distortion that tend to favor the view at the center of the field of view versus the periphery. It would be advantageous to have an effective means to judge these effects.

Images have content characterized by features of various types, occurring at particular locations in the image and/or distributed across the images. Mathematical algorithms are known for application to digital images comprising arrays of pixel values, wherein the algorithms contain one or more mathematical functions that are sensitive to the presence of particular features. By operating such algorithms on pixel data, a numeric assessment is obtained that measures the extent to which the features are present, producing output values that are greater or less depending on the presence and prominence of associated features. The assessment can be localized, producing values associated with individual pixel positions or groups of pixels, or the assessment can be generalized across the image, producing one output value. Operating an algorithm that is sensitive to a feature to produce a numeric value in that way, such as assessing the level of contrast between pixels at a certain distance, is known as extracting that feature. The algorithm that does the mathematical analysis is known as a feature extraction algorithm.

One can apply such mathematical analyses to pixel image data in an effort to characterize the image quality of a digital image from a microscope or other source. However objective measures that may correlate with image quality also are affected by variations in the content of the image apart from image quality. For example, an objective measure correlating with the sharpness of an image can be obtained by integrating the pixel-to-pixel differential in luminance and/or color value between each pixel and its neighboring pixels, across an image or in a discrete area of the image (i.e., by extracting that feature). Other measures could involve assessment of the peak signal to noise ratio across the pixel data values, the range of variation in luminance or color values, a statistical analysis of pixel data, etc. These measures may correlate with image quality. For example a high pixel data differential correlates with sharp focus. But such measurements also correlate with image content. A poorly focused image of content characterized by high inherent contrast may produce a higher value according to such objective measures than an accurately focused image of content characterized by low inherent contrast.

Inasmuch as quality measurements based on feature extraction algorithms are affected by content, the results of objective measures of quality are meaningful if the image quality is a variable and the content of the image is not a variable. For this reason, imaging calibration techniques sometimes involve the use of a standardized test pattern of defined shapes and/or colors.

Autofocus techniques use objective measures comparatively, typically to compare the objective attributes of two or more images of the same content at different focal distances, so as to determine which focal distance provides the sharpest focus. Pixel data focused at a given Z distance for a microscopic image in an X-Y plane (or at least for a localized part of the image) can be processed by a feature extraction algorithm to provide a calculated numerical characterization of the image (or localized part) that correlates with image quality, especially focus accuracy. After shifting the Z distance, another pixel data image is obtained at the new distance and processed to obtain another numerical characterization from the same algorithm. The difference between the numerical characterizations is due to the shift in Z distance, because the content is the same. The numerical characterization and the Z distance correlate with the accuracy of image focus. This technique enables comparison of images at two or more distances to choose a distance that produces a relatively accurate focus.

After collecting images at a sufficient number of Z distances (a minimum of three distances), and assuming that the Z distances span the distance at which the optimal focus accuracy might be obtained, it may be possible to calculate the Z distance of the "correct" or most accurately focused plane. The focal plane is adjusted to that Z distance and a final image is collected. To accomplish this, the calculated results of the algorithm are matched to a characteristic curve wherein a peak (or valley, depending on the nature of the calculation) of the curve is considered to occur at the Z distance of optimal focus.

This process is typical of autofocus processes and relies on comparing, for different Z distances, the results of an algorithmic mathematical characterization known to correlated with image quality, especially focus accuracy. Exemplary algorithms include local spatial derivative assessments (perhaps integrated over the whole image or only at a selected discrete area), statistical measures applied to pixel data values for the image or for a discrete area, and similar measures. Additional examples are mentioned below. Focus accuracy is an important characteristic to optimize, but the same considerations apply to other characterizations that may correlate with image quality and may be affected by variables that are controllable, such as the luminance level of a bright field, which can affect quality variables such as the color gamut and relative RGB spectra obtained from color test reference patterns, ratio of peak signal to noise, comparison of central and peripheral pixel values, and other quality measures.

Instead of comparing two or more images obtained from the same content when using two or more different sets of conditions known to affect image quality (such as different Z distances known to affect focus accuracy), one might apply an algorithm to assess image quality for a single image, and obtain one or more output values. Although the value may correlate with an image quality attribute, the results have little meaning unless the image is an image of a known calibration standard (e.g., a test pattern). Even within a single digital pathology image, a sample may contain any of various tissue types and structures. An algorithm correlated with an image quality variable such as focus accuracy produces a given output value for images showing tissue types that are exactly focused but are inherently smoothly varied in appearance (such as the relatively featureless connective tissue or stroma between distinct features, for example). That given output value for inherently low-contrast image content can be comparable to the output value obtained for blurred and poorly focused tissues types that have inherent variations (such dense dermal cells, for example).

Other considerations affect focus accuracy. A sample such as a piece of biological tissue may have a topography characterized by different thickness at different points in the X-Y plane, causing some surfaces on the sample to be closer to the lens than other surfaces in the Z direction. The sample may not be mounted in a way that exposes a plane surface to view. Due to mechanical misalignment, the slide may be tilted relative to a plane tangent to the focus sphere (i.e., other than normal to the optical axis). As a result, the situation may occur wherein some image areas on a slide, and/or some X-Y points thereon, are closer to the microscope optics than other areas or points. Due to characteristics of the optics, the image may be better in some areas, such as close to an optical axis at the center of a field of view, and worse in other areas, such as proceeding out to the periphery of the field of view.

Adjusting the focus usually entails varying the relative distance from an objective lens with one or more relatively fixed lens parts, up to the surface of the sample, bringing the features of interest into the so-called focal plane. The stage holding the sample may be movable toward or away from the mounting of the objective lens, or vice versa. In a manual microscope, a control knob is used for adjusting the distance in the Z direction. In an automated scanning microscope, an electromagnetic or piezoelectric mechanism or the like, controllably adjusts the distance in the Z direction.

When viewing the sample through the microscope and adjusting for focus with a manual control knob, one typically moves the Z distance up to and beyond the point of optimal focus, and then moves back, homing in on the correct focal distance by adjusting to obtain the sharpest image available during viewing. After manually dithering through the focal distance in this way, the operator has some confidence that the sample has been viewed for all that it reveals, namely in the best focus available from the instrument. The manual homing or dithering operation may also be sufficient to pass the sample through a range of Z distances that is sufficient to exceed the range of Z distances caused by variations in topography. But if an image is collected automatically, the image is taken at a given distance in the Z direction. If one requires viewing at two or more different Z distances, then it is necessary to collect two or more digital images.

In a digital microscopy system, tissue samples are prepared in the usual way of being mounted on glass slides, but instead of having the pathologist view the samples using a manually controlled optical microscope, the slides are processed using digital cameras coupled to the microscope optics to collect microscopic pictures. Incremental stage positioning controls step the viewing area over the surface of the slides. The scanners can collect images of the sample at different resolutions or preferably, images taken at high resolution can be combined or "stitched" together to provide image files that encompass plural high resolution images. The pathologist views the digitized images of the slides on a computer workstation, using the zoom and pan functions of image display software to navigate the sample. Disclosures of collecting and stitching together high resolution images of adjacent areas for such purposes, can be found for example, in published US applications 2009/0195688—Henderson et al. and 2008/0240613—Dietz et al., the disclosures of which are hereby incorporated. Such techniques achieve many of the functions of manually controlled optical microscopes, and have additional advantages. For example, the digital data can be stored indefinitely as a permanent record. Image data can be retrieved and transmitted readily using network communications. Digital images of slides can be organized and used more efficiently than the glass slides themselves. Digital images can be navigated rapidly for X-Y position and magnification/zoom, as well as annotated and processed in various ways.

Typically only one digital image is stored per logical image segment, e.g., one image per tile in a mosaic. It would be possible in a digital pathology system to use a scanning device to record multiple images of the same area at slightly different focal distances, with the imaged surface of the sample being slightly above, slightly below and preferably just at the optimal focal distance of the microscope optics used in the scanning device. With a sufficient number of views, this could enable a person viewing images on a computer workstation to select images at slightly different focal distances in the same way that a user of an optical microscope dithers the focal distance adjusting knob to seek the distance with the best focus. However, data processing and data storage needs would be multiplied to obtain, store and manage each high resolution image.

Accordingly, preliminary steps are undertaken to adjust for focus, preferably when collecting every logical image segment but optionally at some other schedule. The slide is imaged from the focal distance that is chosen during preliminary focusing operations. Instead of recording multiple images at different focal distances (wherein some of the images inherently would be taken at an incorrect focal length), an autofocusing control is employed to make the necessary focus adjustments before the image of a tile or other segment is recorded and stored. The plan is to record one image per final image capture operation. The autofocusing control selects the optimal focus distance at which the image is captured. An X-Y stage positioning control advances the field of view to an next position on the slide. The process is repeated to pass over and collect snapshot frame images of the entire slide or the full area of the sample, or of a selected area to be imaged.

Autofocusing controls in digital imaging operate by numerically analyzing the pixel data with an algorithm that measures a total amount of contrast in luminance or color values between adjacent pixel positions. A higher total value for the contrast measurements indicates that an image is in better focus, other things being equal. Autofocus controls typically attempt to compare alternatively focused versions of the same image content, such as the same content focused at slightly different focal distances. It is possible to provide a numerical measure of total contrast in an image, but one cannot meaningfully determine focus quality independent of the content of an image because the results of numerical measures, such as an integrated total of the local contrast through the image, vary with image content as well as with the accuracy of focus.

An exemplary autofocus control is disclosed in U.S. Pat. No. 7,576,307—Yazdanfar et al., hereby incorporated by reference. A predictive autofocus control is disclosed in US Publication 2009/0195688—Henderson et al., mentioned and incorporated above. These controls use primary and secondary imaging sensors, and a Z positioning control for altering the focal length. An object is to compare the accuracy of focus at two or more different focal distances, and to find the distance at which the focus is best, whereupon an image at that distance is taken and stored. The process involves comparing a measure of focus quality for two or more differently focused images of the same image content. In that situation, a numerical measure of focus quality is meaningful (such as a sum of local contrast values for all pixel positions). One can conclude that the focus distance that produces a higher total from the measure of contrast (or other focus quality measure) is closer to the best possible focal distance than the distance that produces a lower total from the same measure.

The collected images become the tiles or local frame areas. These areas typically overlap somewhat in zones where the content of the tiles is aligned and the pixel values are knitted or "stitched" to merge over the transitions with other adjacent tiles so as to form a composite image of the sample. Examples of image alignment and stitching can be found in U.S. Pat. No. 6,785,427—Zhou and published application US 2008/0240613—Dietz, which are hereby incorporated in the present disclosure by reference.

When collecting digital images of image segments adjacent to or spaced from a given position at which autofocusing and Z position controls were used to select a best focal distance, one can assume that the same distance is the best distance for all other image segment positions across the sample. At the other extreme, it is possible to repeat the autofocusing and Z position selection steps to attempt to obtain a best focal distance independently for each image segment. Another alternative is to obtain a best Z position for a given image segment and to use that Z position for all image segments within a certain X and/or Y distance of the given image segment, repeating the Z position selection at intervals of a certain number of image segments, or when changing from one row or column of image segments to a next, etc. In published application US 2006/0204072—Wetzel, which is hereby incorporated, plural tiles at spaced points are tested for optimal Z positions for best focus at each point. A reference plane is then fitted as nearly as possible to intersect the best focus distances, and the Z positions for each tile across the specimen are chosen as the corresponding positions on the fitted plane.

A best focus Z position may be determined for a reference image segment and used for some larger area encompassing adjacent image segments. For example, an image segment at the center of a specimen or a zone on the specimen, can be used as a reference image segment for which an optimum Z position is determined. That Z position can be chosen after a relatively involved and careful autofocusing procedure, and used for a group of remaining image segments that are stitched together into an image or portion of an image. Alternatively, the Z position of the reference image segment can be merely a starting position when undertaking a new autofocusing procedure for each next tile, optionally using a procedure that is less involved. It remains possible that the best focal distances for different image segments or distinct areas within the segments may be at different focal distances, considering the mounting of the slide, the topography of the sample and other factors. What is needed is a way to compare and to indicate or otherwise respond to a situation in which the focus quality varies between the reference image segment and other image segments in the group wherein the Z position might or might not have been determined independently, and the image segments are stitched together into a larger mosaic or montage image.

Image assessment algorithms are known, but generally are most useful to compare alternative images of the same image content at different focal distances. A challenge is presented when attempting to assess image quality independent of image content, for example to grade the quality of focus for various images showing different samples or different areas on a given sample.

The foregoing discussion and examples are applied only to focal distance and focus quality issues. Focus is one example of the more general issue of choosing among the alternative conditions that are used to collect a digital image of a sample, when differences in the conditions affect image quality. For example, it may be possible to select among alternative conditions of front and/or rear lighting or lighting amplitude, illumination spectra, polarization conditions, image collection time, aperture size and depth of field, etc. Typical solutions employ nominal conditions or in the case of autofocus use a controller to select perceived optimal conditions, but can result in some variation in the depth of the focal plane from one image segment to another and some variation in the quality of the focus. This disclosure is primarily exemplified using focus accuracy as the image quality criterion of interest and Z position as the variable that affects image quality as measured by contrast. The disclosure is not limited only to that quality criterion, or only to that variable or technique for measuring image quality. The disclosure is likewise applicable to other quality criteria, other variables that affect focus and/or other quality criteria, and other possible measures by which focus or other quality criteria might be measured.

Using focus as a representative image quality criterion, there are a number of focus assessment image processing algorithms that can produce a numerical measure of focus quality that may not indicate a level of quality in an absolute sense but at least varies with quality in a way the allows two pictures of the same image content to be meaningfully compared. In "Autofocusing in Computer Microscopy: Selecting the Optimal Focus Algorithm," Y. Sun et al., *Microscopy Research and Technique* 65:139-149 (2004), the following algorithms are compared:

Derivative Based Algorithms:
Thresholded Absolute Gradient (Santos et al., 1997)
Squared Gradient (Santos et al., 1997)
Brenner Gradient (Brenner et al., 1971)
Tenenbaum Gradient (Tenengrad) (Yeo et al., 1993, Krotov, 1987)
Sum of Modified Laplace (Nayar and Nakagawa, 1994)
Energy Laplace (Subbarao et al., 1993)
Wavelet Algorithm (Yang and Nelson, 2003)
Wavelet Algorithm $W_2$ (Yang and Nelson, 2003)
Wavelet Algorithm $W_3$ (Yang and Nelson, 2003)
Statistical Algorithms:
Variance (Groen et al., 1985, Yeo et al., 1993)
Normalized Variance (Groen et al., 1985, Yeo et al., 1993)
Autocorrelation (Vollath, 1987, 1988)
Standard Deviation-Based Correlation (Vollath, 1987, 1988)
Histogram-Based Algorithms
Range Algorithm (Firestone et al., 1991)
Entropy Algorithm (Firestone et al., 1991)
Intuitive Algorithms
Thresholded Content (Groen et al, 1985, Mendelsohn and Mayall, 1972)
Thresholded Pixel Count (Green et al., 1985)
Image Power (Santos et al., 1997)

Such image processing algorithms are useful to obtain an objective measure of pixel data characteristics such as the level of contrast found between pixels or groups of pixels in an image, which measure correlates with focus accuracy but also correlates with image structural characteristics, i.e., image content. Such image processing algorithms can compare image quality characteristics in a meaningful way when comparing alternative images containing the same content (i.e., when all aspects of the comparison are the same, except for the focus or other aspect of image quality). A numeric algorithm produces different objective scores for different types of image content. The algorithm may produce a lower objective score of contrast (or other variable value associated with quality or focus accuracy) for some types of content compared to other types of content, even when the quality is actually better in the image whose content produces the lower objective score.

What is needed is a way to make an automated assessment of image quality, especially focus accuracy, that is independent of image content or is as dependable as a comparison of the same image content in two alternative pictures of the same image content, but without the complications that are typical of autofocusing techniques wherein two or more images of the same image frames are collected at different Z axis distances, and compared to determine whether one or the other produces an image of better quality.

SUMMARY

In order to meet these and other needs and objects, two or more digital image segments are obtained, generally for adjacent image areas such as blocks or elongated strips, by image acquisition operations such as snapshots or line scans. The image segments overlap one another along a margin, such as a margin at which pixel values of adjacent overlapping image segments are merged or stitched together to provide a smooth transition across the junction of separately acquired image segments that are joined into a larger image. The initial acquisition of the two or more image segments provides at least two versions of a same portion of the larger image, namely two images of the content in the margin wherein the image segments overlap. These versions are each processed to obtain an objective measure that correlates with image quality, such as the accuracy of focus, determined for example by integrating the differences between pixel values of adjacent or nearby pixels. The objective measures for the two overlapped margins provide a meaningful basis for comparison and grading of the quality of the two or more image segments, because in the overlapped margins, the same image content appears. As a result, the objective measures are not affected by variability in image content.

Objective measurements that correlate with image quality (such as focus accuracy) and also correlate with image content, are valid for quality comparison between separately acquired images, because in the area where the margins overlap, they contain the same image content. Comparing the areas in the margins with the same content causes variations due to image content to drop out of consideration. The image areas used for comparison can be the whole margins if the margins register exactly, or if the margins do not register exactly, then in limited parts of the margins where their contents overlap.

Relative assessments are obtained in this way for the overlapping margins. Both margins may be found to register an equal image quality measurement, or one of the margins will be found to measure higher quality and the other lower quality. It may be unknown from the relative assessment whether the quality of the images in the margins is good or bad in an absolute sense. If the quality measurements are equal, the two overlapping margins could be equally good or equally bad. But because the quality assessments are independent of content, different results indicate a difference in quality. A numeric measure of the extent of this difference is obtained and can be analyzed.

Comparative quality assessments enable conclusions to be reached, for example, to discriminate for images that should be re-acquired. It may be advantageous to reacquire an image segment if the margins of the image segment produced a distinctly lower relative quality number compared to one or several of the neighboring image segments with which the image segment shares overlapping margins, namely more than a threshold difference in relative quality. Differences in results that appear to be directional and common to plural tiles or other image segments can be identified to reveal certain information useful for diagnosing problems in the alignment of the sample, microscope and camera. In some embodiments, the results can be visualized graphically, by numeric labeling or color coded mapping to image segments in the outline of the mosaic image. The technique provides an image quality assessment without the need for quality calibration references, or even a reference image other than the overlapping of margins.

It is an object of the present disclosure to assess the image quality in discrete areas of an image comprising a montage or mosaic of acquired digital image segments, whether an array of tiles, a pattern of strips or patches, or another image segment arrangement comprising margins that overlap, such as margins where adjacent image segments are blended to merge smoothly across a perimeter. According to one aspect, the technique relies on determining the relative image quality of adjacent image segments based on the comparative quality of the same image content found in the overlapping margins. After obtaining relative assessments of each margin versus its overlapping duplicate in the next adjacent image section's margin, the results of the comparison can be extended by making logical conclusions from the results such as by noting the existence of patterns that either indicate or may suggest probable conclusions about the quality of particular image segments or areas of image segments or the overall mosaic of many image segments.

Each margin is found to be of higher or lower quality than the overlapping margin of the next adjacent segment according to a numeric quality measure correlated to quality. In the case of tile shaped image segments, tiles except for the outer edges have four directionally distinct edges, on the top-bottom-left-right. The relative difference values can be assessed as separate populations, for example by analyzing and comparing the relative quality measure of the top margin of each tile versus the bottom of the next vertically upward adjacent tile. Similarly but conversely, the bottom edge values can be considered compared to the next downward vertical tile and so on for the lateral sides. Another measure is to take the mean-square-root of the differences for all four edges of a tile (namely averaging the absolute value of the difference between each margin on the tiles and the overlapping margins of the four adjacent tiles.

According to an advantageous aspect, quality value difference numbers obtained for the tiles or for their margins or for paired margins (such as the opposite or adjacent margins on each tile) can be analyzed statistically. In one technique, the populations of values for respective margins (all the top margins's difference from the overlapped bottom margin of the next upper tile, for example) are analyzed according to one particular measure, producing a population of difference numbers having a maximum, minimum, mean and standard deviation. For example, the top margins might be analyzed for differences in Brenner gradient (integrated contrast). The tiles then are analyzed again, for example for a different margin such as a lateral margin, or using a different measure, such as a summation of Laplace values. The similarities and differences of the results in the two measures can be further analyzed. For example, where the Brenner and Laplace (and potentially additional measurements) produce different histogram shapes (different bell curves), the values can be normalized to force the populations to fit a similar curve shape. The normalized values are used for the analysis.

The population of image segments and their respective quality grades can processed in these and other ways. The results by image segment, edge or combination of edges and measurement algorithm can be separately determined and reduced to visual mapping for discerning information and to discriminate between acceptable and unacceptable image segment acquisitions. The technique provides an image quality assessment that is substantially independent of image content, and does not require a reference image to be used as a calibration standard or multiple full segment copies to be selectively compared.

The objective measure correlating with image quality advantageously can be a measure that correlates with accuracy of focus, such as an assessment of the level of contrast. Such measures also typically correlate with aspects of image content. An image of a striped tiger or a spotted leopard inherently has more contrast than an image of a tawny lion. But according to the disclosed techniques, the relative quality of adjacent image segments is meaningfully compared by exploiting the fact that overlapping margins of the image segments contain the same image content, from respective image acquisition operations that might have produced different degrees of focus accuracy or other quality criteria. The output of an objective measurement, such as a numerical algorithm that totals local contrast over the overlapping margin areas, produces two values or measures that can be compared meaningfully because the measurements apply to alternative image captures of the same content.

According to another aspect, the values produced by the numerical algorithm for each of the two or more margins that overlap, allows the image versions (each of the overlapping margins) to be graded relatively, as having a higher or lower quality than its marginally overlapping neighbor. Considered as a population, the overlapping image segments have quantified relative comparisons of their quality versus that of their adjacent segment. These range from highest to lowest comparative value. The extremes and the population are useful to define acceptance/rejection criteria. Statistical analyses of mean and standard deviation can identify outliers that may be deemed unacceptable. A proportion of image segments can be deemed unacceptable in a percentile sense. A range of acceptability can be determined according to relative position in the population. The relative values can be determined and mapped to indicate visually the aspects of comparative image quality across the complete montage or mosaic of image segments.

The image segments used for comparison conveniently are regular shapes such as a scanned strip or a captured square or rectangular block of pixels. However the image segment can be any regular or irregular shape that overlaps another segment such that multiple adjacent image segments, including apex or corner areas where four or six or more segments may all overlap the same content. This disclosure, wherein the image segments are exemplified by square or rectangular or otherwise shaped tiles in a mosaic, or elongated strips or bands, is not limited to a particular shape, and may be applicable to various shapes that are defined or arbitrary, provided there are overlapping areas, especially margins for stitching together, at which two or more versions of the same content can be compared.

A number of algorithms are known for assessment of local contrast and similar objective measures that at least partly correlate with image quality, especially the accuracy of focus. A nonlimiting example is a summation of Brenner gradient values for all the pixels specifically located in the overlapping margins. The use of the same algorithm on two distinct images of the same content, namely the two overlapped margins, produces a content-independent measure of the relative focus accuracy of the two abutting and marginally overlapping image segments. According to another technique, multiple assessments correlating with the same or different quality criteria can be applied, such as measures of pixel data derivative values that are optionally normalized, statistical analyses and population distribution criteria, etc. The result is to discriminate, and optionally also visually to map, measures of quality across the overall image comprising stitched-together image segments.

The quality assessments can be extended to all pixel positions in an image segment, grading different positions across the image segment by interpolating between the values determined for the overlapping margins and placed at some grade point between the best and the worst values found. These grades can be converted into a color mapping, for example showing the highest quality areas using a distinct color (e.g., peaceful colors for green or blue for best quality) and the lowest quality areas with another color (e.g., warning colors of red or orange). The colors are used to populate a version of the original image that can be displayed in conjunction with the display of the image to the pathologist, e.g., alongside or in a miniature inset or by a selectable mouse click operation. Certain situations that result in variation of focus quality across the frame of an image segment, for example due to misalignment of the microscope optics and the plane of the slide on the stage, are clearly shown in the color mapping. It is likewise possible to use the assessment to trigger re-acquisition of the image of selected image segments.

The technique can be applied using software in the processor associated with the automated slide scanner of a digital pathology system, as an image processing method. Whereas the calculations needed to provide a quality assessment, such as a Brenner gradient assessment, are relatively uncomplicated but repeated many times, a field programmable gate array or similar hardware/firmware solution can be provided to provide high speed calculations in conjunction with the image segment image capture and stitching processes.

The disclosed embodiments can provide a focus quality and other quality assessments using various different assessment algorithms, and in each case the assessment is independent of differences in types of tissue structure seen on different image segments of the mosaic or montage, because the same image contents, namely the overlapping parts of adjacent image segments, are used to form the relative assessment of quality between the two image segments, and eventually among all the image segments in the larger mosaic.

BRIEF DESCRIPTION OF THE DRAWINGS

The following is a discussion of examples, certain alternatives and embodiments of the systems and methods disclosed as novel ways to address the objects and aspects discussed above. The invention is not limited to the embodiments that are shown or described as examples and is capable of variations within the scope of the appended claims. In the drawings, FIG. 1 is a schematic illustration of an exemplary image acquisition arrangement in connection with digital pathology, the illustration depicting exaggerated misalignment of the sample slide versus the optics, and an exaggerated degree of variation in the topography of the tissue specimen.

FIG. 2 is a plan view of a specimen slide with overlapping image areas in which separate digital image acquisitions have been accomplished, shown as an array of marginally overlapping rectangles.

DETAILED DESCRIPTION

Figure 3:
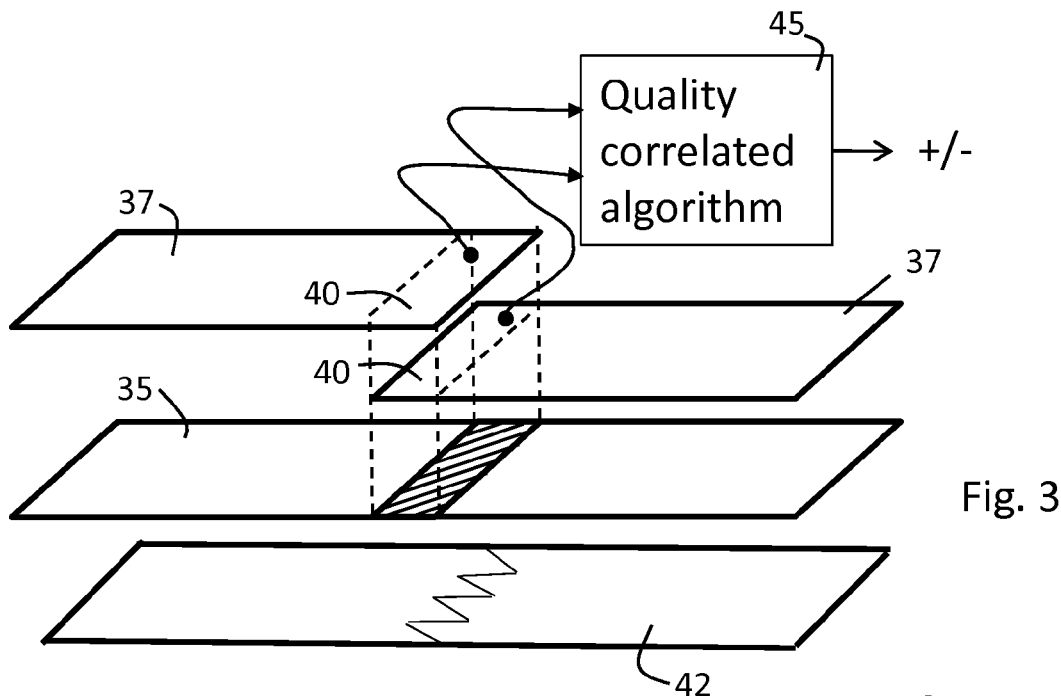
FIG. 3 is a schematic illustration showing the application of a quality correlated algorithm for obtaining a comparative measure of image quality. The algorithm is applied to the marginal areas of two adjacent image segments where they overlap along an edge.

According to the present disclosure, the quality of a digital image, especially the accuracy of focus for a microscopic pathology sample, is assessed comparatively for adjacent image acquisition segments such as tiles or strips, that overlap along a margin at which edges of the two image segments contain the same image content. Advantageously, this margin can be the overlapping edge at which the two segments are joined or stitched together by image processing techniques to provide a smooth transition. In an image that comprises adjacent segments to be joined or stitched together at such a margin, the overlapping parts of the image segments contain two separately acquired versions of the image content in the zone of overlap, each associated with its own image acquisition. The two images of the content in the overlapping margins may ultimately be averaged or interleaved to provide a smooth transition from one image segment to the next in a finished composite image, such as a mosaic of image segments. However it is an aspect of the present technique that the two versions of the margin content that are available because of the overlap of adjacent image acquisitions at the margin also are compared, and provide a measure of relative image quality.

The presence of two images of the margins is exploited according to the present inventive techniques, by making a comparative numerical quality assessment of the image quality in at least two versions of the overlapping margin areas of two distinct image acquisitions. A comparative or relative quality assessment is possible because the content depicted in the two images is the same, although obtained in different image acquisitions. Comparative quality assessments preferably are made for successive image acquisition segments across the composite image, and over multiple margins that overlap, such as at four edges of rectangular or other shapes that are tiles in a composite mosaic. The margins that overlap in pairs for all of the adjacent segments are assigned relative quality assessments. A signed numerical value is assigned to each member of each margin that overlaps another margin. The sign identifies which member is better or worse, and the value is a measure of the extent of difference. Alternative algorithms for making such assessments are disclosed herein. Two or more such algorithms can be used to contribute to the assessment. The results for different algorithms can be normalized. Acceptance thresholds can be defined. The grading or acceptability of the image segments, or parts of the image segments, can be presented visually in a map corresponding to the composite image of stitched together image segments.

A numerical quality assessment such as a summation of Brenner gradients across an image segment or an edge or shape enhancement and assessment process is an objective measure from a mathematical perspective. But for practical purposes, the numerical values produced by the assessment do not correspond directly with image quality because the values are affected by image content. According to an aspect of the disclosed techniques, variations produced by variable image content are eliminated because the assessment is a comparative assessment of margins that represent the same image content in plural image acquisitions.

FIG. 1 schematically shows an exemplary image acquisition arrangement as used in connection with digital pathology. The depicted image acquisition devices can be part of an automated slide scanning system with an automatic slide feeder operable to feed and load slides for imaging one at a time from a magazine, but the autofeeder aspects are not shown to simplify the drawing.

A specimen 22 carrying a tissue sample or other subject is mounted on a slide 24 carried on a stage 25, exposed through optics 26 to an image sensor 28 coupled to a computer processor 30 that can process the digital image data and store, transmit or display images on a display device 32. The slide 24 and microscope optics 26 are relatively movable, for relatively positioning the optics at a point in a plane extending in the X-Y directions, for selecting a position on slide 24 to be imaged, and for relatively adjusting the spacing between the optics 26 and the specimen 22 in a Z direction for selecting a focal distance. Preferably, an autofocus control is employed to selectively test the accuracy of focus at two or more Z axis spacings, enabling the device at least once per slide to select an optimal focal distance. The slide preferably is imaged repeatedly in adjacent areas or is passed in a scanning sweep through the image acquisition area shown. In an exemplary embodiment, the image is acquired, the stage is advanced in the X and Y direction to a position in which an adjacent area is moved into the image acquisition area, and the image is acquired again. The computer processor 30 is programmed to manage the pixel data images from the image sensor 28, in particular by organizing the images so that a viewer using display 32 (or another display in data communication with processor 30) can navigate over the composite image comprising plural acquired images arranged in abutting positions and preferably merged together by image stitching transitions in the pixel data.

As shown in exaggerated fashion in FIG. 1, the specimen 22 may have some variation in height. The slide 24 and/or stage 25 may be relatively misaligned relative to the optics such that one side of the image acquisition area is relatively higher than another. There are possible optical variations resulting in variations in the quality of the image across the field of view. The illumination of the sample may vary. These and similar variations can result in differences in image quality across the area of one image acquisition and across the area of the slide encompassed by plural image acquisition areas to be imaged and displayed in adjacent fashion under control of a computer system 30 on display device 32.

The microscope optics 26 are coupled to an image sensor such as a camera 28 that collects and digitizes a two dimensional still image or picture of the specimen image acquisition area, in a snap shot format. Alternatively, the image sensor can comprise a line scan sensor that is relatively moved over the specimen in a direction perpendicular to elongation of the line scan sensor for collecting a two dimensional image during periodic sampling of elements along the line scan sensor in a sweeping fashion. The resulting two dimensional pixel digital image data is loaded into a computer system 30 having a processor and memory for data and program coding, operable to present images on a display 32. The computer system can be coupled over a data communication network for remote data storage, data manipulation and database operations for image data management, practitioner (pathologist) workflow management, patient information management and other uses.

In the case of high resolution image acquisitions, the respective acquired images can correspond to elongated adjacent scanned strips or to rectangular or otherwise shaped tiles in an array forming a mosaic or montage wherein the respective edges of the acquired images are merged into one another around their perimeters (except for tiles on the perimeter of the mosaic). The whole mosaic or montage can be viewable as one image at low resolution or navigated at higher resolution from one acquired image to another across the perimeters at which the acquired images abut. The transition from one image to the next is smoothed by averaging across the margin at which the separately acquired image segments abut. Advantageously, the smoothing of the transition is accomplished by acquiring images that overlap the same areas of the specimen 22 or other subject. The processor 30 optionally matches the same content in the margins of the two images to align the images as exactly as possible. The processor 30 merges the images across the boundary by weighted averaging, by interleaving pixel values and otherwise by smoothing the data to produce a transition from one image to the other that occurs over the width of the margins instead of abruptly at a discrete line.

FIG. 2 illustrates an example wherein the sample image 35 is composed of a regular array of image segments 37 that may be acquired in successive snapshots after positioning the stage 25 and/or optics 26. As shown in FIG. 2, the respective image segments 37 overlap one another at one or more margins 40. These are the margins at which the image segments can be merged or stitched together by the processor 30. The image segments 37 can alternatively be elongated adjacent strips with overlapping margins, quadrants or other portions divided from an image, etc. In FIG. 3, two image segments 37 are shown, each having a marginal part 40 that overlaps the other such that two versions of a portion of the specimen image 35 are provided. These advantageously are the same margins that are to be merged together by the processor 30 (see also FIG. 1) by stitching the image segments together across the margin to form the composite image 42.

An image analysis algorithm 45 is applied to the pixel data for the two overlapping marginal areas 40. The image analysis algorithm 45 can be any of the algorithms mentioned above such as derivative, statistical, histogram/population distribution algorithms, which correlate with at least one variable that is deemed to be favorable in an image, i.e., an algorithm correlated with image quality. For purposes of explanation and without limitation, the algorithm can be exemplified by an algorithm that produces a numerical value correlated with the accuracy of image focus. The numerical value is affected by the content of the image, but if applied to two image margins 40 that encompass the same content, a difference in the numerical values produced by the algorithm for the two margins 40 is a measure of the differential quality of the images at these two margins.

Figure 4:
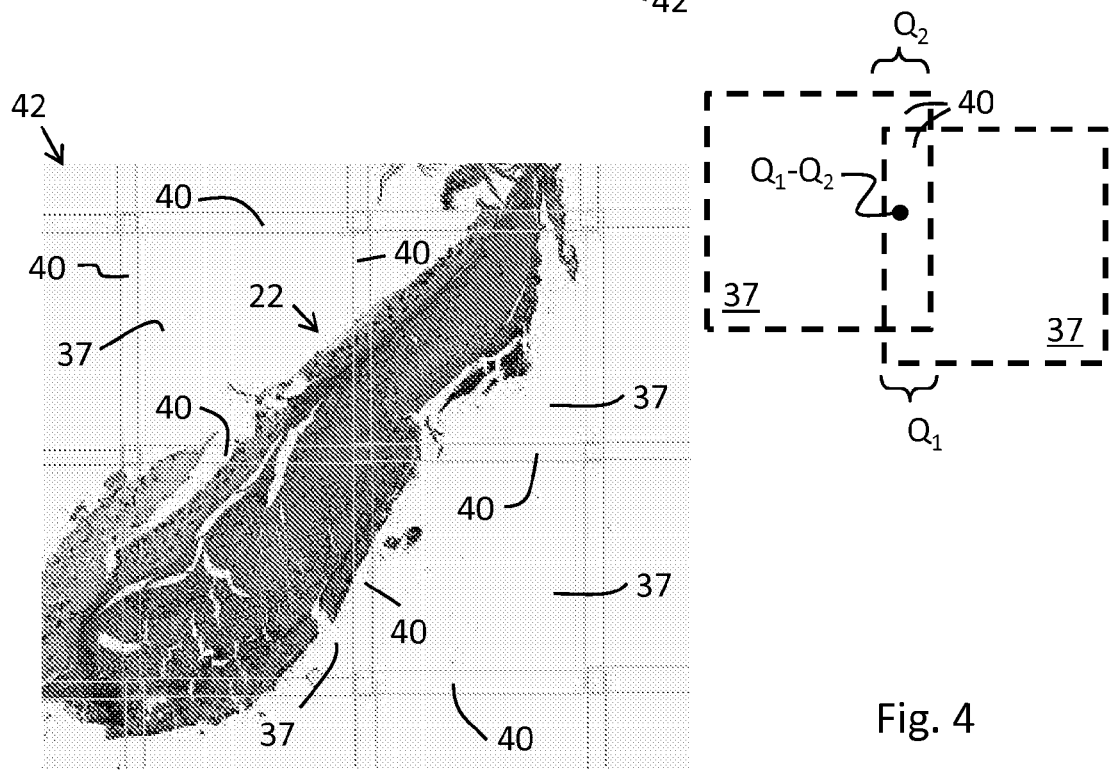
FIG. 4 is a plan view showing an image area with overlapping image segments of regularly shaped tiles in an array.

In FIG. 4, an array of regularly placed image segments 37 form squares or tiles in a mosaic composite image 42 wherein the image of specimen 22 is seen. As suggested by FIG. 4, it is not unusual for the specimen to occupy a limited area of the slide surrounded by blank areas. During the imaging process or afterwards, one or more of the image segments 37 can be determined to be a blank segment and omitted from the process of comparing image quality calculation.

Each segment or tile 37 shares an overlapping margin 40 with its adjacent tiles. In this square or rectangular array, tiles except at the outer edges of the imaged area have four adjacent tiles which marginally overlap the area of any given tile. Each tile has a top, bottom, left and right margin containing an image area that that can be compared with its overlapping counterpart image area of the adjacent tile. The quality assessment algorithm is applied to margins 40, producing two output values $Q_n$ that correlate with a quality variable, such as focus accuracy. The relative quality assessment is the difference of the output values for the two overlapping areas, namely $Q_1$-$Q_2$. This value may be signed positive or negative depending on which image segment scored higher in the quality related algorithm 45, and the absolute value is a measure of the extent of difference in quality determined by the algorithm 45. As discussed above, the results from the algorithm 45 do not determine whether the images are of high or low quality at the image margins 40, but only rate the image quality at the margins relative to one another.

It can also be seen in FIG. 4 that four image segments 37 overlap one another at the corners where the depicted rectangular tiles are laterally and vertically adjacent. It would be possible with a different shape such as a hexagon to have six segments overlap at a corner. Such corners can permit a comparative rating among four or six overlapping versions of the corner area and a relative grading of all the overlapping contributing segments. However the corner blocks are small and contain relatively few pixels, and the corners are at the maximum distance from the center of the image segment 37, and typically the center of the field of view, where the optical system is likely to perform best. As a result, the difference value data that can be developed from the corner areas is not as dependable as the data that is produced by the top, bottom, left and right margins. In one arrangement, all the pixels that overlap in the margins 40 are used to produce an output Q from the algorithm 45 and thus to contribute to the difference value $Q_1$-$Q_2$. Alternatively, it is be possible to ignore the data from the extreme corners for a limited distance and to base the calculation on the central part of the margins near the vertical and horizontal midlines.

The difference $Q_1$-$Q_2$ in the output of algorithm 45 for the respective margins 40 is interpreted in the programming of processor 30 as an indication that one of the margins is of higher quality and a measure of the extent. The sign and value of the difference are stored.

An array of image segments 37 with overlapping margins 40 in longitudinal and lateral directions, is shown in FIG. 4. At each overlapping margin 40, two versions of the content are provided, and two values are produced by the algorithm 45. If the value of the algorithm correlates positively with quality, such as a contrast assessment algorithm wherein a higher assessment of contrast suggests better focus, a signed value represents the positive or negative differential value produced by one or more quality correlated algorithms 45 for overlapping margins 40 of the adjacent image segments 37.

The image data segments 37 can be graded, at the margins or (with some cross correlation due to image content) across the area of the image segments apart from the margins. It may be possible to posit relative quality assessments for the entire image segments 37 using the relative quality assessments from one image segment to the next based on the results at overlapping margins. However, the relatively quality assessments at the margins can differ for different edges of a given image segment versus its adjacent neighbors. This aspect of the disclosed technique has advantages because it may be possible to identify a pattern in the orientation of relative quality assessment results. Certain patterns are associated with corresponding aspects of the image collection apparatus. For example, a regular variation wherein the top, bottom, left or right margins show a higher or lower relative quality assessment than the other margins may indicate an optical misalignment or tilt of the stage or of the loaded sample slide.

Figure 5:
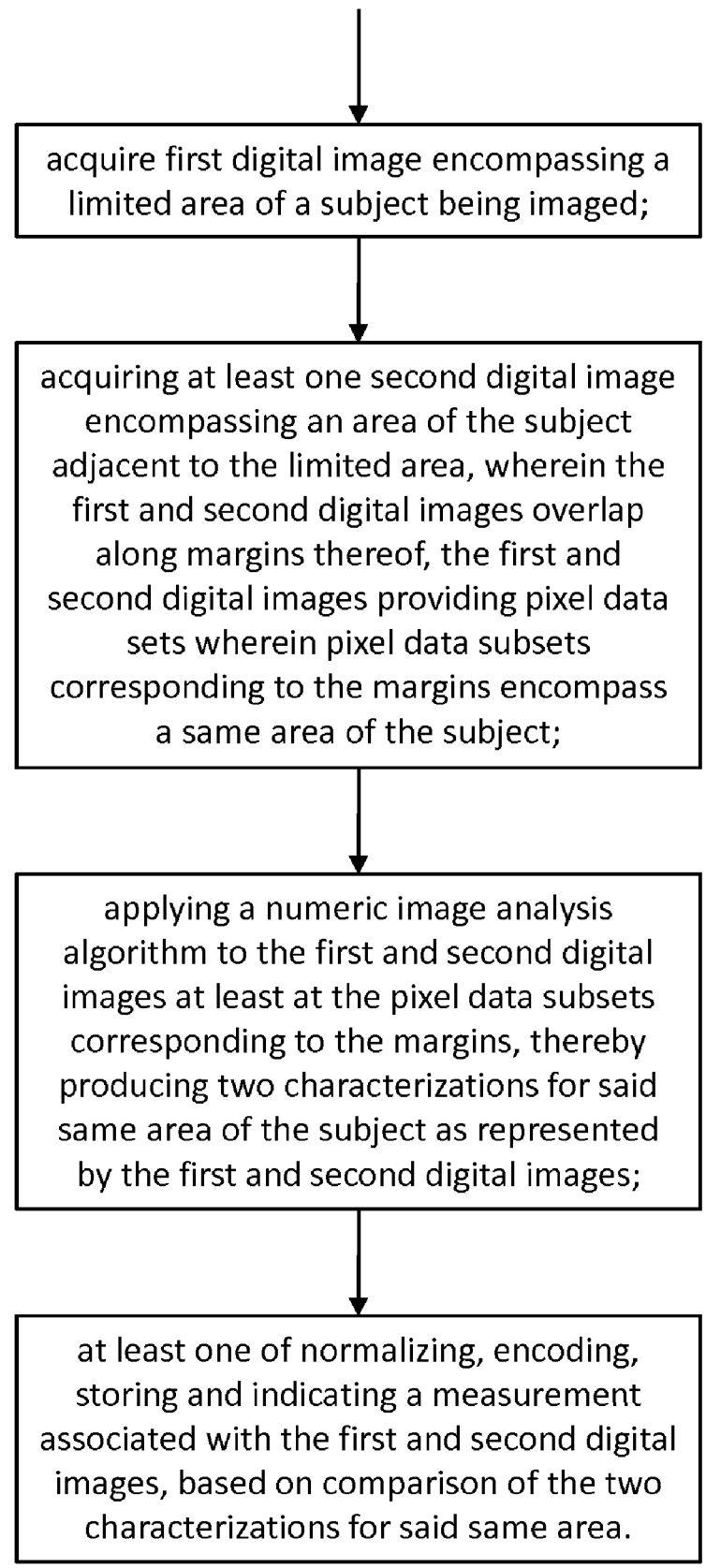
FIG. 5 is a flow chart showing the succession of method steps accomplished according to an embodiment of the disclosed technique.

FIG. 5 shows the steps of the disclosed method in block diagram form. The method generally comprises applying an image quality algorithm. In one arrangement, a number of image quality assessment algorithms are applied, of the type used for autofocusing applications. These different algorithms extract values that are sensitive to image quality aspects, especially focus accuracy, and also to other aspects of image content. The application of the algorithms can be termed "feature extraction" because such algorithms mathematically measure characteristics of features found in the image content. In addition to algorithms sensitive to local image contrast, feature extraction based on Canny edges, image gradient and Laplacian features, local image statistics features and wavelet features are useful.

Having obtained feature measurement values for overlapping margin versions of the same content and difference values identifying which margin scored higher or lower and by how much, the resulting data can be processed in various ways. The feature extraction or difference data can be optionally normalized. A value is encoded and stored indicating a measurement associated with the first and second digital images at the margins, and in particular the overlapping margins. The respective values can be applied to threshold detection techniques using thresholds that are predetermined or determined based on the population of results. The results can be viewed image-by-image, for example by applying selection criteria based on the four signed comparison values between each image segment and its neighbors. The results for a number of image segments can be viewed together, for example by assessing the results in one part or another of the image of the sample tissue. Advantageously, the results for a number of image segments are discriminated by orientation. Thus, if it is seen that a larger proportion of the image segments have a characteristic pattern wherein the quality difference is favorable on one or more edges and unfavorable on one or more opposite edges, misaligned optics or a tilting specimen are suspected. Preferably, several assessments of relative quality are used, for example based on a comparison of the results on a same edge (e.g., the tops or bottoms or left sides or right sides of all image segments), an average and/or range of values for each segment and the percentile in which these values rank in the population, etc.

Figure 6:
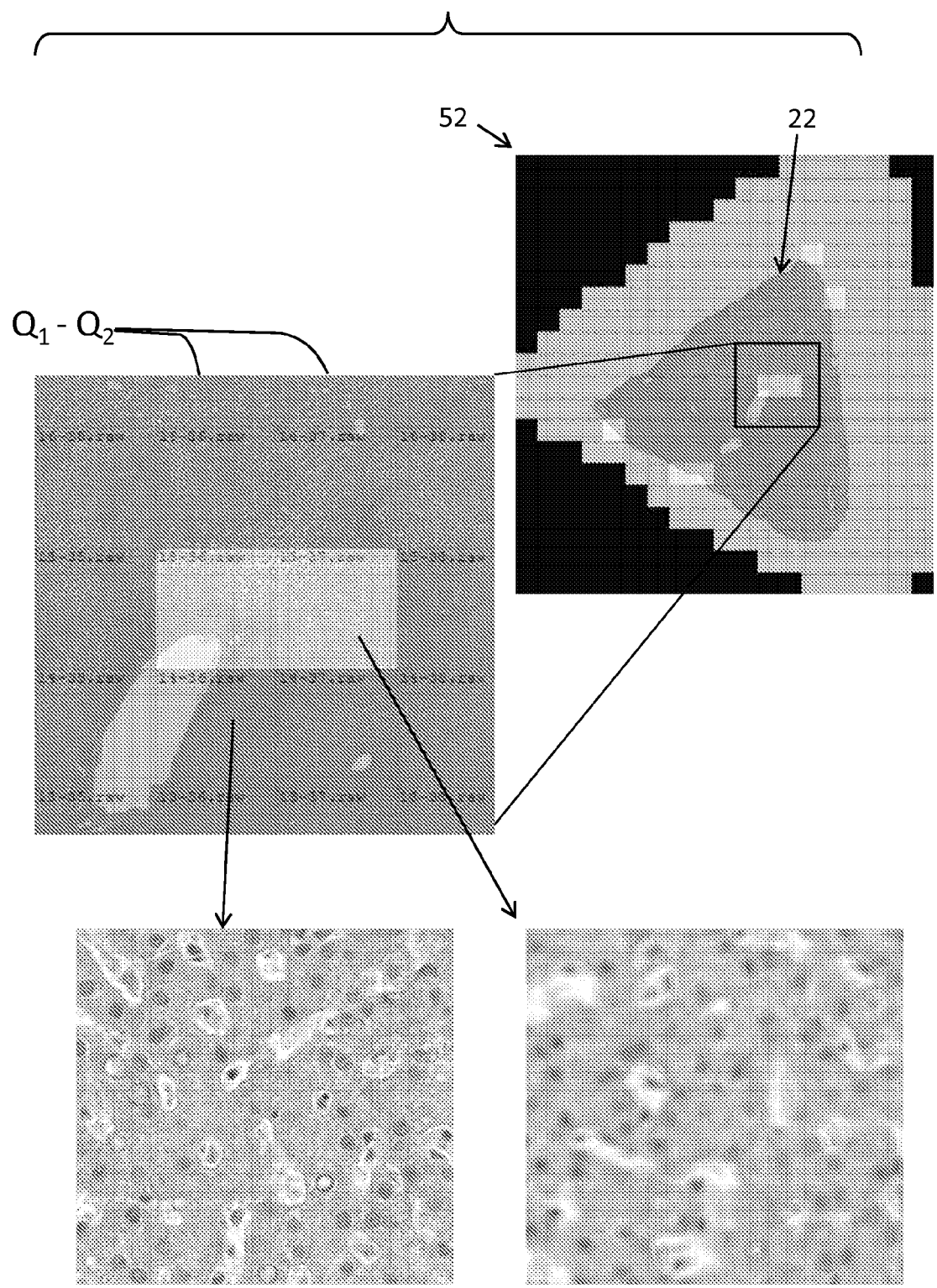
FIG. 6 is a microscopic image comprising a number of image acquisition areas discriminated for difference in quality along one or more margins, with results indicated by shading or color coding on blocks placed to correspond to respective image segments. The shading or color coding can represent grading or can represent the results of a threshold comparison, e.g., with blocks that meet or don't meet a threshold level being differently shaded or colored.

FIG. 6 illustrates an assessment based on top edge difference values. Row and column numbers are labeled in tabular fashion in a zoomed window. The shading (color coding) superimposed on the mosaic of image segments coincides with a threshold of acceptance. Such a display can be presented for reference together with a display of the mosaic image. A similar display can be generated for all bottom edge comparisons, or left or right side comparisons, etc. For single tiles, the average and the range between maximum and minimum difference values may be useful to identify suspect image segment captures.

In one embodiment, plural algorithms or feature extraction processes, for example as selected from the list mentioned above, are applied to each of the overlapping margins and a difference value is obtained for each feature examined. The different feature extraction algorithms are useful for out-of-focus detection and for assessing quality in different situations. As already discussed, their dependence on image content is removed from the comparison because the algorithms are applied to the same content in the overlapping margins. Moreover, the feature extraction values that are obtained are not directly quantitatively comparable because their responses have different magnitudes and change at different rates.

A two-step normalization approach is advantageously used to normalize both the magnitude and rate of change of features associated with focus accuracy as a measure of image quality. This normalized feature difference value is described by:

$$\Delta f_i(I_1, I_2) = \frac{\min(k_i)}{k_i} \cdot \frac{f_i(I_1) - f_i(I_2)}{|f_i(I_1)| + |f_i(I_2)|}$$

where $I_1$ and $I_2$ are the overlapping regions in the two images, $f_i$ is a feature value of feature vector f with i as the index, and $k_i$ is the slope of the feature difference relative to focus depth trained from obtaining multiple stacked images, for example during autofocus procedures. The second fraction on the right implements the normalization of the magnitude. It converts the features from an absolute difference of feature responses to a relative measure by essentially normalizing relative to their magnitude. For a particular feature, as the feature values approach each other, this term goes to zero. At the other extreme, when the values are very different, the denominator term ensures that this term is between ±1, depending on the sign of feature differences.

The first fraction on the right implements the normalization of the change rate. This is accomplished using a set of stack of images for training the change in feature differences versus distance in depth from the true focal plane. A linear function is fit to the response of each feature, and the slope $k_i$ of each function is used to represent the sharpness of each feature response (all features pass through the origin at distance zero by definition). The numerator of this fraction is set to the minimum of these slopes to ensure that the fraction is bounded between 0 and 1. Thus, with the combination of these normalization terms, the normalized feature differences are bounded between −1 and +1. This normalized relative feature difference (or simply "feature difference") permits a meaningful comparison among different types of features. The feature differences are combined by taking the median of all included feature differences, leading to the overall feature difference score, which can be assigned a grade of good or bad or somewhere between. This value can be compared with an acceptance threshold.

The sign of a feature difference indicates the relative quality of the compared images (such as focus accuracy). A positive sign means that image $I_1$ is better than image $I_2$. Thus, the magnitude and sign of the difference provides the relative measure of image quality.

When using multiple measures that each develop relative differences in image quality, preferably with their results normalized as discussed, the results can be processed by averaging the effects of the different measures. The presence of extreme results from one or more measures can be cause to reject an image capture or a whole slide mosaic. Alternatively, extreme results can be eliminated from consideration in favor of the measures that appear to agree. In each instance, the effects of the image content are not a factor because the assessments are based on comparing the results of quality-correlated numerical algorithms using the marginal areas 40 of adjacent image segments 37 that overlap and contain the same image content.

The population of image segments 37, by virtue of the relative quality assessment of their margins, define a range of image quality assessment comparison values ($Q_1$-$Q_2$), both positive and negative. The ranges and distributions of quality assessment comparisons are useful in some respects to identify image segments that may need attention or recapture. The values of the differences when associated with an orientation aspect of the images are independently useful, because a pattern of differences associated with orientation may suggest optical misalignment or tilt of the stage or specimen.

Difference values on one or more measures of quality from quality assessment algorithms are useful in some respects to provide a measure of overall image quality or information suggesting a need for realignment and possibly recapture of some or all of the images. Often a recapture is needed because comparative results reveal a large difference for particular image segment comparisons compared to other comparisons. It is conceivable instead that the quality difference measurements may indicate that the images were found to be of approximately equal quality in the margins 40. Yet that quality might be uniformly poor. In an advantageous arrangement, preliminary steps can be taken to establish benchmark focal distance conditions, for example for a first image segment 37 to be captured, or perhaps repetitively at some schedule. Preferably, at least cursory or predictive autofocus steps are used when capturing each of the image segments 37. But it is also possible to analyze some image capture segments extensively, to provide extra assurance of focus accuracy or calibration. Where it is known that one or more particular segments are based on such extra assurance, the range of quality difference measurements can be seen to rely on the assurance that at least the extensively analyzed image segments are likely to be accurately in focus. The distribution of differences between quality assessments of margins 40 thus represents a population of image segments that ranges from the high quality state downwardly, instead of ranging around an arbitrary norm that might be a low quality.

The subject quality assessment method can be carried on while image segments are being imaged, and preferably completed while the slide remains in the scanning area of the microscope. Particular segments 37 that do not meet an acceptance criterion based on their difference value at one or more edges can be queued for re-imaging. Where the range of difference is high throughout the mosaic of image captures, it may be appropriate to repeat imaging of the whole slide and/or to alert an operator, etc.

An advantageous application of the invention is the assessment of the accuracy of focus in microscopic digital pathology. During the acquisition of two different image segments 37, the microscope may not focus to the same accuracy at the marginal overlapping portions of both adjacent segments, for example due to tilt or sample topography issues as shown in FIG. 1. Badly out-of-focus images may not be useful for diagnostic purposes and even a slightly out-of-focus image may generally be difficult to analyze and annoying to the user. The focus accuracy at a particular point on a tile can vary between excellently sharp and fatally blurred. Focus accuracy sometimes varies across the area of a tile, e.g., being sharp at one corner or side of a tile and fuzzy at the opposite corner or side, or perhaps sharp at one of the center and the periphery of the tile and blurred at the other.

According to an aspect of the disclosure, a contrast measurement is obtained specifically for the marginal areas at which adjacent tiles overlap one another. The contrast measurement can be a sum of Brenner gradient for all pixels or for selected pixels in the array of pixels in the image, a Laplacian transform or a similar measure of the extent of total contrast present, a statistical analysis of contrast or a combination of these. The same gradient, transform or analysis algorithm also can be applied with different pixel spacing scales or weightings. These and similar measures correlate with image quality, especially the degree of focus accuracy. By taking two measures for respective overlapping portions of two adjacent tiles containing the same content, and comparing them qualitatively and for quantitative difference, algorithm results that are difficult or impossible to compare due to variations in image content, are made useful to resolve image quality in a more nearly absolute sense.

In a situation where there is a substantial difference detected between particular overlapping margins compared to other overlapping margins, such as a measured difference over a predetermined threshold, the image acquisition controls can automatically conclude that acquisition of one or more images has failed. Where a pattern emerges, particularly with respect to orientation, for example differences that are larger for top versus bottom margin comparisons compared to left versus right (or in combinations, such as top-left versus bottom-right compared to top-right versus bottom-left, etc.), the patterns are advantageously noted and reported. Orientation-specific patterns are usefully displayed on a map corresponding to the sample image, potentially revealing system misalignment and/or optical issues that can be corrected and scanning resumed.

FIG. 5 is a flow chart showing the steps of the disclosed method. A first digital image 37 is acquired encompassing a limited area of a subject 22, 35 being imaged, and at least one second digital image is acquired encompassing an area of the subject adjacent to the limited area. The first and second digital images are caused to overlap along margins 40, thus causing the first and second digital images to include pixel data subsets, namely those pixels corresponding to the overlapping margins, that encompass the same area of the subject, i.e., the same content in two distinct images 37, the quality of which images is to be assessed.

The technique can also comprise first finding overlap regions where neighboring images acquired across a tissue sample encompass the same content. This step may be accomplished in connection with aligning the pixels of adjacent image segments to register them in correct relative position as tiles on a mosaic and/or as a step before merging or stitching adjacent images together.

The extent of the overlap region between two adjacent images or tiles that are acquired, typically successively, is roughly defined by the parameters of the stage movement. The stage displacement distance between the centers of adjacent image capture areas is a distance less than the size of the acquired image along a side of the image measured in that direction of displacement. This produces overlapping margins 40.

The portions of the image segments 37 used as the overlapping margins 40 need not include all the overlapped extent of pixels in the image segments, but at least include some marginal pixels. In one example, the image segments might be 2000 pixels on a side. The margins 40 might overlap by 200 pixels or 10%. The extreme perimeter edges of both segments 37 can be ignored, for example by a width of 25 pixels each. Optionally, the extreme corners of the image segments might be ignored, for example by 100 pixels from the corner. The remaining marginal overlap of 150 pixels wide by 1800 pixels long on each segment 37 can be used as the overlapping pixel area. It is also possible to employ other specific numbers and proportions, such as 4096 pixels on a side of an image segment 37 and other larger or smaller proportions for the overlap and useful area thereof.

In any event, a numeric image analysis algorithm is applied to the first and second digital images at least at the pixel data subsets corresponding to the margins, thereby producing two characterizations for said same area of the subject as represented by the first and second digital images. The technique does not exclude the possibility of further steps to apply the same or other algorithms to zones of the image segments 37 apart from the overlapping margins 40, but such steps are not encompassed by the present disclosure, which relies on relative measurement of areas (margins 40) having the same content and potentially different assessments according to one or more of the assessment algorithms 45. The algorithm may be any one or more of various measures, advantageously involving at least one quality assessment and optionally a plurality of assessments, and for microscopic pathology/histology digital imaging preferably includes a measure of focus quality.

The relative measure obtained from application of the algorithm to the margins is used for one or more of normalizing quality and/or other pixel data values, or defining and operating upon a range or distribution of pixel data values, encoding, storing and indicating one or more measurements associated with the digital image segments 37 that are compared, triggering a decision to pass/fail or re-image all or part of a specimen and generally to assess the image based on a comparison of the two characterizations for the same area. These activities benefit from the fact that the same image content appears in both versions of the overlapping margins, although potentially with variations in focus accuracy or other quality criteria, and as a result, the comparison of results from the quality-correlated algorithm 45 provides meaningful no-reference quality information that is not affected by a correlation with image content.

The technique can be incorporated into the image processing procedures that are used to align adjacent images by adjusting or relatively displacing images with overlapping margins until the content in the margins most nearly corresponds. Ideally, the pixels in the overlap region of the two images should be aligned to exactly the same points on the underlying tissue, but practically there are differences because of minor variations in image acquisition and pixel alignment. The process of registration of the tiles or images includes aligning the relative positions of the images to align the contents of the two overlapping margins. This alignment step also assists in enabling the composite mosaic of tiles to be stitched across the margins in later image processing, typically involving a running average of pixel values at aligned points in the overlapped margins, so that the tiles all together form a large mosaic in which it is possible to navigate across the borders between adjacent tiles.

If the images are in focus in the overlapped margins of both tiles, the pixel data at corresponding points in both margins is very similar. If one or the other of the margins is not in focus, the pixel data can be quite different. If both images are equally out of focus, the pixel data may be similar once again. According to the present technique, one or more objective numerical algorithms correlated to focus are applied to both margins, producing a numerical assessment that can be equal or different. Insofar as there is a difference, one of the two overlapped image margins is seen to be in more accurate focus than the other.

In one embodiment used to measure the difference of the images, a large number of different feature assessments that produce objective numerical measures can be obtained for both of the overlap regions of the images. These can be among those mentioned as alternative assessments of focus accuracy, such as the output of a derivative based algorithm (e.g., Canny edges, thresholded absolute gradient, squared gradient, Brenner gradient, Tenenbaum gradient, sum of modified Laplace, wavelet), or statistical algorithm (e.g., variance, normalized variance, autocorrelation, standard-deviation based correlation) or histogram algorithm (e.g., a range algorithm or entropy algorithm) or an intuitive algorithm provided the result is a quantification (e.g., thresholded content, thresholded pixel count, image power).

Where multiple algorithms are applied, each algorithm can be considered to be sensitive to one or more characteristics of the image (i.e., "features"). Various algorithms are sensitive to focus accuracy, but some may also be sensitive to other aspects such as the presence of shapes or the variability of the image content. The application of the same algorithm to both margins 40 tends to reduce the effects of image content, but one algorithm or another may produce a larger or smaller numeric difference when applied to particular overlapping margins 40. Having multiple algorithms makes the technique versatile and responsive in a range of image content situations. In order to avoid the problem of features dominating the difference calculations, normalization is used as described. According to one technique, a threshold can be set for a maximum acceptable magnitude of the feature difference. According to other techniques, magnitude for marginal overlaps all around a given image segment are totaled and a threshold maximum acceptable total is applied. As another technique, difference values for all the image segment overlaps with a given orientation are separately evaluated against a threshold and optionally mapped to a visual presentation associated with the position of the respective segments 37 on the sample mosaic image.

Figure 7:
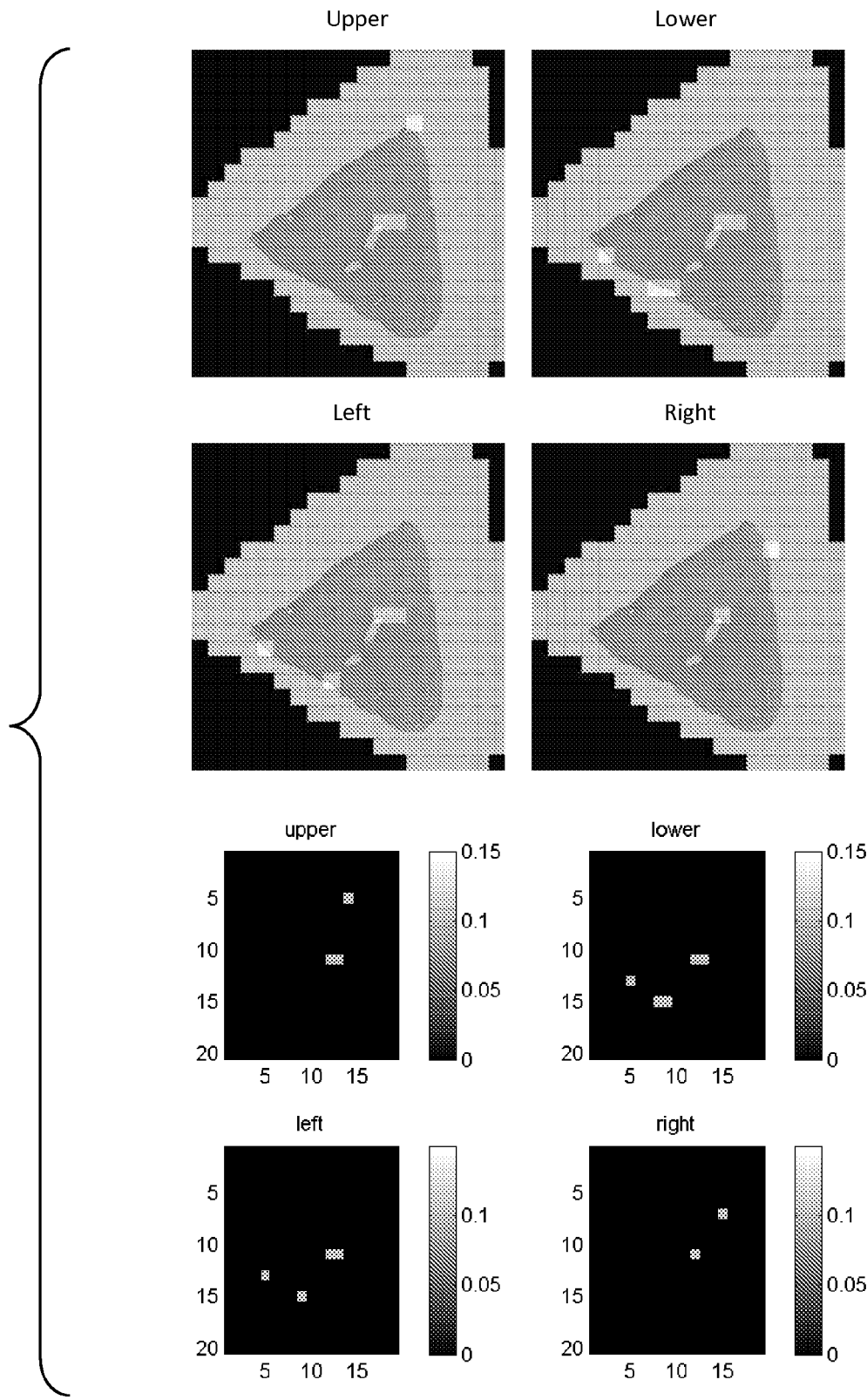
FIG. 7 is a multipart color-coded (shaded) map, overlaid on the image of a specimen at the top, and shown separately at the bottom with a shading scale, wherein the discrimination of quality difference values is based on the orientation of the compared margin to the image segment.
Figure 8:
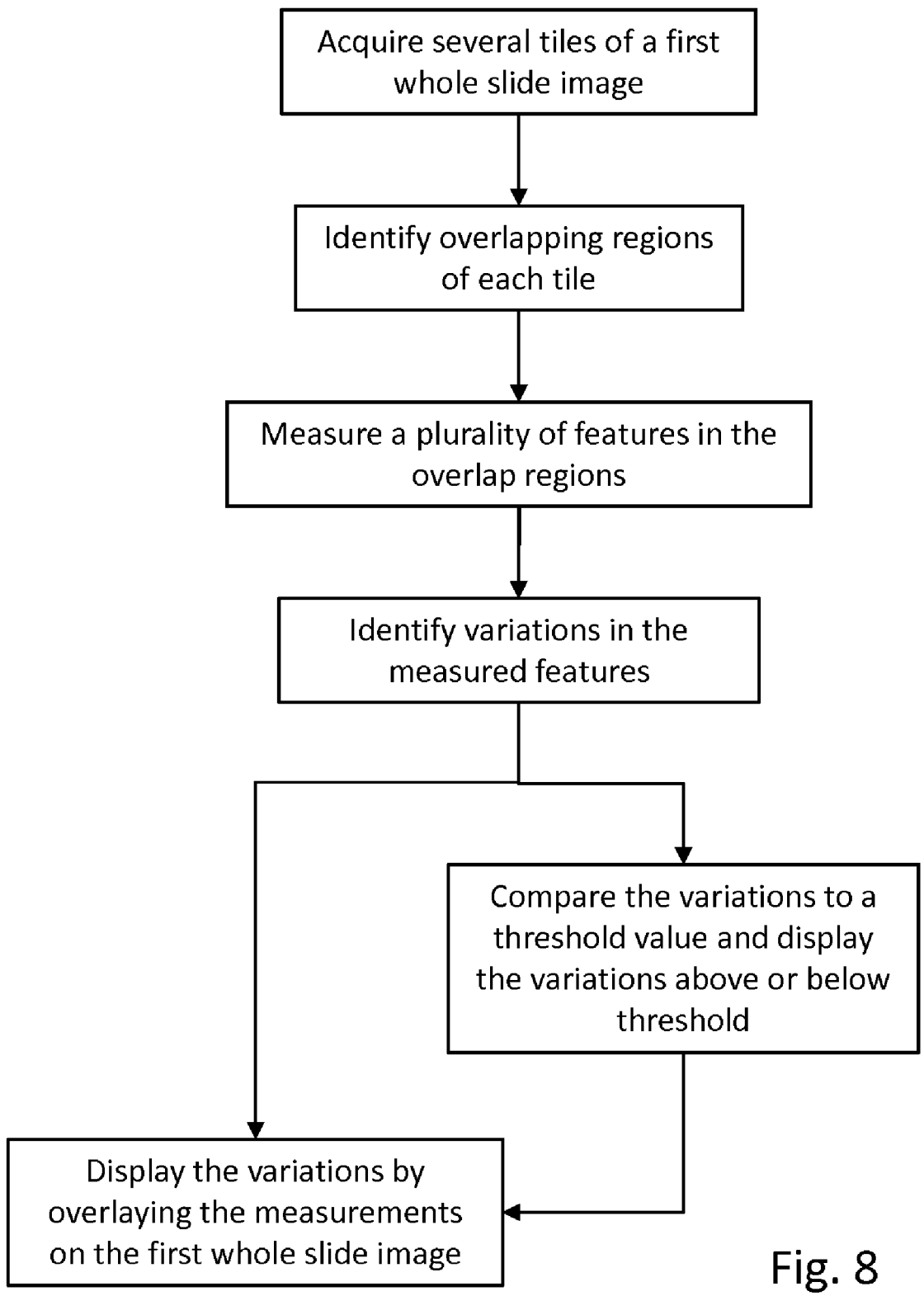
FIG. 8 is a flow chart showing particular steps in practicing the technique according to one embodiment wherein one result is a display as exemplified by FIG. 7.

FIG. 6 illustrates an embodiment wherein the difference values found, determined by the method flow charted in FIG. 8, have been determined to fall in ranges between maximum and minimum differences, and the ranges are identified by distinct colors (represented in the drawings as shades) applied over the corresponding image segment in the mosaic image. In FIG. 7, the extent of the numeric differences is also demonstrated by color or shade distinctions, thereby highlighting those areas of the mosaic wherein distinctly different results were obtained. This figure also contains an enlarged illustration of selected tiles, showing a difference in image quality exemplified by a tile that is in focus compared against a tile that is blurred.

In the embodiment of FIG. 6, the values posted can represent a composite figure based on the differences for all four margins associated with a given image segment 37. FIG. 7 demonstrates at the top an embodiment wherein the results are presented visually as in FIG. 6 over the image of the mosaic, but four separate assessments are done for each of the margins, namely for the top, bottom, left and right margins, respectively. The presentation can be shaded to identify the position of each value in a range, for example using a color coding spectral range. In each case there is one value per image segment 37 and the position of the segment is colored or shaded accordingly. At the bottom of FIG. 7, the same color or shading presentations are shown but not as superimposed on the mosaic image.

Figure 9:
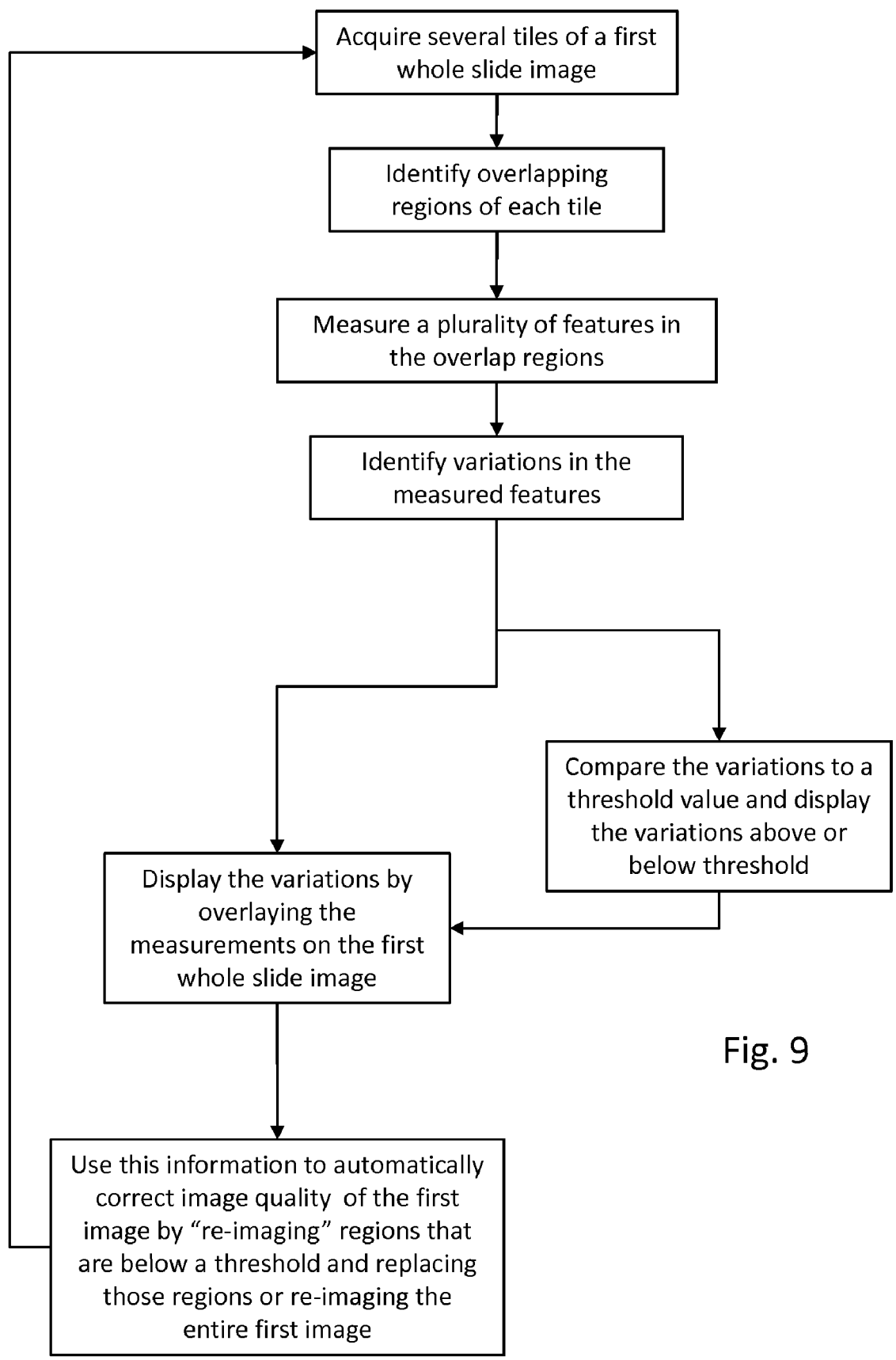
FIG. 9 is a flow chart corresponding to FIG. 8, but wherein another result is the queuing of re-imaging for selected image acquisition segments.

Displaying the results of the assessment is also an aspect of the flowchart of FIG. 9. Additionally, FIG. 9 illustrates the step of selection of acceptable image segments from all the segments and re-imaging those that do not meet selection criteria.

The particular feature assessment(s) or the combination of assessments used can be selectively chosen based on trial runs of the algorithms on overlapped image margins. For example, in assessing focus accuracy, the feature assessments that most closely follow expected trends through the image stack at different focal distances can be used selectively.

FIG. 6 shows visual mapping of the results of the technique shown in FIG. 8, and FIG. 7 shows two distinct techniques. In the embodiment of FIG. 6 and at the top of FIG. 7, the respective image segments 37 have been aligned and stitched together by processing pixel data in overlapping margins as discussed, and the margins are not identified. At the bottom of FIG. 7, the results are shown in a shaded or "heat map" presentation with a reference scale alongside for comparison. The heat map uses colors to distinguish areas that by threshold comparisons are considered to have a quality that does not meet a predetermined threshold, preferably in alarm colors (e.g., orange or red). Areas that meet the threshold are shown in soft colors (e.g., blue or green), generally represented in the drawings by darker shading.

The disclosed technique is an image processing method, including acquiring a first digital image, such as a tile or strip image segment 37, encompassing a limited area of a subject being imaged, and acquiring at least one second digital image encompassing an area of the subject adjacent to the limited area, wherein the first and second digital images overlap along margins 40 thereof, the first and second digital images providing pixel data sets wherein pixel data subsets corresponding to the margins encompass a same area of the subject. A numeric image analysis algorithm is applied to the first and second digital images at least at the pixel data subsets corresponding to the margins. This produces two characterizations for the same area of the subject as represented by the first and second digital images. The results from the algorithm can be normalized, encoded, stored, applied to thresholds, applied visually to indicate a measurement associated with the first and second digital images, and generally to make and report quality assessments based on comparison of the two characterizations for said same area of overlap. The technique does not require a reference image for comparison, and can operate effectively using the two views of the margin of overlap to infer quality assessment information about the entire image.

The subject being imaged is a pathology specimen slide of which a plurality of microscopic digital pictures are taken by snapshot or scanning or similar techniques that produce an overlapping area such as a margin of overlap at adjacent edges. Each of the digital pictures corresponds to a respective said limited area. The plurality of microscopic digital pictures together encompass all or at least a predetermined portion of the specimen or specimen slide including the specimen.

In the embodiment shown in FIG. 4, at least some of the plurality of microscopic digital pictures overlap other said microscopic digital pictures on at least two edges. In corners and the like, more than two areas may overlap as shown, e.g., four edges for rectangular image segment or six for hexagonal ones, etc. These corner areas where several segments 37 overlap may be compared, but the dependability of the data may be better if the corner areas are ignored.

The numeric analysis can comprise at least one of a derivative based algorithm, a statistical algorithm, a histogram based algorithm and an intuitive algorithm, producing a numerical value correlating with an accuracy of focus at pixel positions in the margins. Alternatively, other measures of quality and other techniques for representing such measures numerically or comparatively can be employed. In an advantageous embodiment, the numeric analysis includes generating at least one summary value characterizing accuracy of focus for each of the overlapping margins. The method comprises ranking by relative accuracy of focus the first and second digital images that overlap along margins. This process can be carried on for successive pairs of overlapping image segments. Without any reference image or standard for calibration, the image segments can be ranked by focus accuracy or other quality criteria. Where one or more of the image segments was obtained in connection with operation of an extensive autofocus control sequence (for example a calibrating step used initially or periodically using numerous Z axis focal distances), that aspect can be taken into account, for example by assigning an assumed high quality assessment to the image segment that resulted directly from operation of this improved autofocus control step. In a sense, this technique employs a calibration reference in the form of the extensively autofocused image segment. The inventive technique does not require that all image references be excluded.

The numeric analysis or algorithm generates at least one summary value characterizing the quality, preferably the accuracy of focus, for each of the overlapping margins. Inasmuch as the content of the image is the same in the overlapping margins, the results of the algorithm, and in particular the difference in the values produced for the respective margins, quantifies a difference in relative accuracy of focus of two said digital images that are adjacent and overlap along their margins. Quantifying the quality of the image segment as a whole can be based wholly or partly on the difference in the summary values for one or more of the respective overlapping margins.

The inventive method is applicable to various image collection processes wherein adjacent images are collected to be assembled into a montage or mosaic of strips, tiles or other shapes, wherein the process produces overlapping margins that are optionally useful for aligning and/or stitching together the adjacent images. For digital pathology imaging specifically, the method comprises mounting a pathology or histology specimen on a slide defining an X-Y plane, and arranging the slide on a stage of a microscope having a digital scanning or still shot camera for recording at a Z axis focal distance a magnified image of the specimen at an X-Y position. The microscope has a control for positioning the field of view in the X-Y plane and a relative focal distance control along the Z axis. The Z axis control may be part of an autofocus system.

The camera may be used to obtain and at least temporarily store successive pixel data images at different focal distances for each image segment to be captured, applying a focus accuracy algorithm to determine and select or perhaps to predict a preferred focal distance, then collecting the pixel data image for that image segment. An initial set-up process for a slide optionally can be used to select a focal distance for a first image segment captured. Autofocusing attention is useful to provide some assurance that some of the image segments that are captured are of high quality (such as accurately focused). However the comparison of quality-correlated algorithm results at the overlapping margins generally operates without the need for a reference image for calibration or similar purposes.

After obtaining a first image segment, the field of view is advanced in at least one of an X direction and a Y direction by a distance sufficient to encompass an image segment on the specimen adjacent to a previously collected image segment, including a marginal area of overlap with one or more previously collected image segments. A next pixel data image is obtained, and by continuing to advance the slide, and to collect pixel data images with marginal areas of overlap, images encompassing all or a predetermined portion of the slide are recorded as adjacent image segments of an array. The predetermined portion can be the portion occupied by the specimen or a particular area of the specimen that has been identified for scrutiny.

The pixel data in the marginal areas of overlap is analyzed by applying a numeric image analysis algorithm correlated with image quality. Due to the overlap, at least two pixel data sets at overlapping margins or other shapes represent the same content in at least two of pixel data images. This produces at least two characterizations for said same area of the subject and the same image content (but for variations in quality), represented by the first and second digital images. One or more of the algorithms discussed above can be employed, or another algorithm that produces a numerical quality assessment can be used. In an advantageous example, the algorithm can be a totalization of local contrast values, such as a Brenner Gradient calculation. The Brenner Gradient algorithm computes the sum for all pixels of the first difference between a pixel value i(x, y) and the corresponding pixel value of a neighboring pixel with a horizontal or vertical distance of two pixel positions. That is:

$$F_{Brenner} = \sum_{Height} \sum_{Width} (i(x+2, y) - i(x, y))^2$$

where $((i(x+2, y) - i(x, y))^2 \geq \theta$ (namely when the difference exceeds a threshold). The pixel value "i" can be a luminance or color-based variable value for the pixel such as the sum or average of R, G and B amplitudes. The same algorithm also can be applied with a different (e.g., longer) spacing between local pixels.

The differences in the quality of the adjacent overlapped image segments in the array are signed and quantified by the positive or negative difference between the numerical characterizations of quality for the overlapped margins of the image segments. The image segments can be graded relative to one another, as a no-reference population, based on the extent of difference from their adjacent pixels. The grading can be a summary for plural margins of each image segment, or the margins on corresponding sides of many image segments can be considered together, discriminating for differences that are related to orientation. For example, one of the top or bottom or left or right sides can be considered together for some or all of the segments to discern orientation-related variations in comparative quality. The signs and/or absolute values of the differences are considered with orientation in mind. The signs and difference values for two opposite sides can be considered together to define variables that relate to vertical or horizontal orientation. Also, pairs of adjacent sides can be considered versus the opposite paired sides to discern information on a diagonal orientation.

The disclosed technique addresses problems associated with acquiring composite microscopy images wherein some image segments are of better quality than others and some are simply insufficient. Preferably the foregoing method steps are accomplished during the process of acquiring the image segments. The quality of each next-overlapping segment is assessed relative to neighbors, and the assessment information is saved in memory. After a first acquisition of all the necessary image segments, the system can process the quality information and re-acquire the images with the worst image quality while the slide is still mounted for imaging.

The technique sidesteps the challenge of assessing image quality on a subject that may include a variety of tissue types and structures that inherently produce different contrast assessments or similar objective measures correlated with image quality. Use of the comparative strategy disclosed herein removes variations in assessed objective measures that are due only to differences in image content.

The foregoing disclosure defines general aspects and exemplary specific aspects of the subject invention. However the invention is not limited to the embodiments disclosed as examples. Reference should be made to the appended claims rather than that the forgoing description of preferred embodiments, to assess the scope of the invention in which exclusive rights are claimed.

What is claimed is:

1. An image processing method, comprising:
   acquiring a first digital image encompassing a limited area of a subject being imaged;
   acquiring at least one second digital image encompassing an area of the subject adjacent to the limited area, wherein the first and second digital images overlap along margins thereof, the first and second digital images providing pixel data sets wherein pixel data subsets corresponding to the margins encompass a same area of the subject;
   applying a numeric image analysis algorithm to the first and second digital images at the pixel data subsets corresponding to the margins, thereby producing two characterizations for said same area of the subject as represented by the first and second digital images, wherein the numeric image analysis includes generating at least one summary value characterizing accuracy of focus for each of the overlapping margins and comparing relative accuracy of focus for the first and second digital images in the margins; and,
   at least one of normalizing, encoding, storing and indicating a measurement associated with the first and second digital images, based on comparison of the two characterizations for said same area.

2. The method of claim 1, wherein the subject being imaged comprises a specimen slide and further comprising obtaining a plurality of microscopic digital pictures, each of the digital pictures corresponding to a respective said limited area and having at least one said area adjacent thereto, and the plurality of microscopic digital pictures together encompassing at least a predetermined portion of the specimen slide.

3. The method of claim 2, wherein at least some of the plurality of microscopic digital pictures overlap other microscopic digital pictures on at least two edges.

4. The method of claim 1, wherein the numeric image analysis comprises producing a numerical value relating to differences in focus measurements in the margins from at least one of a derivative based algorithm, a statistical algorithm, a histogram based algorithm and an intuitive algorithm.

5. The method of claim 1, wherein the numeric analysis comprises applying at least two feature extraction algorithms that differ by at least one of algorithm type and scaling, each of the feature extraction algorithms producing algorithm output values, and discriminating among the digital images based on at least one of individual said algorithm output values and combinations of said algorithm output values.

6. The method of claim 5, further comprising normalizing the algorithm output values before said discriminating.

7. An image processing method, comprising:
   acquiring a first digital image encompassing a limited area of a subject being imaged;
   acquiring at least one second digital image encompassing an area of the subject adjacent to the limited area, wherein the first and second digital images overlap along margins thereof, the first and second digital images providing pixel data sets wherein pixel data subsets corresponding to the margins encompass a same area of the subject;
   applying a numeric image analysis algorithm to the first and second digital images at the pixel data subsets corresponding to the margins, thereby producing two characterizations for said same area of the subject as represented by the first and second digital images;
   further comprising acquiring a plurality of said first and second digital images forming image segments in an array encompassing the subject, wherein the numeric analysis includes generating at least one summary value characterizing accuracy of focus for plural overlapping margins of the image segments, and the comparison of the two characterizations includes determining a difference value having a sign and a value; and
   at least one of normalizing, encoding, storing and indicating a measurement associated with the first and second digital images, based on comparison of the two characterizations for said same area.

8. The method of claim 7, wherein the margins occur on multiple sides of the digital images, and further comprising quantifying the difference values for at least two sides for each member of a population of the digital images and discriminating among the digital images based on the difference values.

9. The method of claim 8, further comprising determining a population of the difference values for at least one of all the sides of the digital images and selectively oriented sides of the digital images, and applying an acceptance criterion for encoding a relative rank in the population of a difference value for at least one oriented side of the digital images.

10. The method of claim 9, further comprising at least one of labeling the digital images in a composite image, and shading the digital images in the composite image, for providing a visual indication of said relative rank in the population.

11. The method of claim 10, further comprising providing the visual indication of said relative rank for a selected subset comprising one or more of said sides of the digital images.

12. The method of claim 10, wherein the visual indication is color coded to distinguish between at least one of the sign and the difference value for at least one of the margins of the digital images.

13. The method of claim 9, further comprising shading the digital images in the composite image, for providing a visual indication to distinguish between digital images that meet and do not meet a predetermined threshold.

14. The method of claim 7, wherein the margins occur on multiple sides of the digital images, and further comprising quantifying the difference values for at least one side for each member of a population of the digital images, wherein the at least one side for each member is oriented toward a same direction, and discriminating among the digital images based on the difference values and orientation of the direction.

15. The method of claim 14, further comprising associating pairs of sides that are one of opposite and adjacent sides of the digital images, and discriminating among the digital images based on the difference values and the orientation of said pairs of sides.

16. The method of claim 14, wherein said discriminating comprises discarding selected ones of the digital images based on the difference values and re-acquiring digital images encompassing a same area of the subject.

17. A method for digital pathology imaging, comprising:
mounting a pathology specimen on a slide defining an X-Y plane;
arranging the slide on a stage of a microscope having a digital camera for recording at a Z axis focal distance a magnified image of the specimen at an X-Y position, the microscope having a relative positioning control in the X-Y plane and a relative focal distance control along the Z axis;
obtaining and at least temporarily storing successive pixel data images at different focal distances, applying a focus accuracy algorithm to determine and select a preferred optimal focal distance, and collecting a pixel data image;
advancing the slide in at least one of an X direction and a Y direction by a distance sufficient to encompass a magnified image of the specimen adjacent to a previously collected pixel data image, with a marginal area of overlap along a margin with the previously collected pixel data image, and collecting a next pixel data image;
continuing to advance over the slide, and to collect pixel data images with marginal areas of overlap until the successive pixel data images encompass at least a predetermined portion of the specimen, each pixel data image corresponding to an image segment in a composite image that overlaps other said image segments at a respective said marginal area, such that at least two pixel data characterizations of the respective marginal area are provided in the first and second digital images;
analyzing pixel data in the marginal areas of overlap by applying at least one numeric image analysis algorithm correlated with image quality to at least two pixel data sets in corresponding areas, and obtaining a sign and difference value for an output of the at least one numeric image analysis algorithm;
discriminating among the pixel data images based on the difference values for the marginal areas of the pixel data sets in the composite image.

18. The method of claim 17, further comprising merging the pixel data images across the marginal areas of overlap to form the composite image of the predetermined portion of the specimen, and navigating the composite image using a digital display.

19. The method of claim 17, further comprising re-acquiring pixel data images where the difference values fail to meet an acceptance criterion.

20. The method of claim 17 further comprising representing at least one of said difference values, a ranking of said difference values and an acceptance status for the pixel data images, on a visual presentation having areas corresponding to the pixel data images in the composite image.

21. The method of claim 17, wherein discriminating among the pixel data images based on the difference values is at least partly specific to an orientation of the marginal area of overlap relative to an associated one of the pixel data images.

* * * * *